(12) United States Patent
Osawa et al.

(10) Patent No.: US 7,055,312 B2
(45) Date of Patent: Jun. 6, 2006

(54) POWER OUTPUT APPARATUS, HYBRID POWER OUTPUT APPARATUS, METHOD OF CONTROLLING THE SAME, AND HYBRID VEHICLE

(75) Inventors: Koichi Osawa, Susono (JP); Toshio Inoue, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/661,674

(22) Filed: Sep. 15, 2003

(65) Prior Publication Data
US 2004/0060535 A1 Apr. 1, 2004

(30) Foreign Application Priority Data
Oct. 1, 2002 (JP) ............................. 2002-289192
Jun. 12, 2003 (JP) ............................. 2003-167716

(51) Int. Cl.
*F01N 3/00* (2006.01)
(52) U.S. Cl. ..................... 60/285; 60/274; 60/277; 60/284; 180/65.2; 180/65.3; 180/65.4
(58) Field of Classification Search .............. 60/274, 60/277, 284, 285, 286; 180/65.2, 65.3, 65.4
See application file for complete search history.

(56) References Cited

U.S. PATENT DOCUMENTS

| 5,942,862 | A | 8/1999 | Yamada et al. | |
|---|---|---|---|---|
| 5,988,307 | A | 11/1999 | Yamada et al. | |
| 6,173,569 | B1* | 1/2001 | Kusada et al. | 60/277 |
| 6,220,019 | B1 | 4/2001 | Sugiura et al. | |
| 6,389,807 | B1* | 5/2002 | Suzuki et al. | 60/285 |
| 6,581,373 | B1* | 6/2003 | Suzuki et al. | 60/285 |
| 6,792,750 | B1* | 9/2004 | Nagai et al. | 60/285 |

FOREIGN PATENT DOCUMENTS

| DE | 198 58 468 A1 | 8/1999 |
|---|---|---|
| DE | 199 52 037 A1 | 5/2000 |
| DE | 100 48 392 A1 | 4/2002 |
| EP | 1 201 477 A2 | 5/2002 |
| EP | 1 201 478 A2 | 5/2002 |
| JP | A 8-144814 | 6/1996 |
| JP | A-9-47094 | 2/1997 |
| JP | A 2000-324615 | 11/2000 |

* cited by examiner

Primary Examiner—Binh Q. Tran
(74) Attorney, Agent, or Firm—Oliff & Berridge, PLC

(57) ABSTRACT

In a hybrid power output apparatus including an engine and a motor generator apparatus, a fuel supply stop process of stopping the supply of fuel is performed after performing a fuel increase process of increasing the amount of the fuel in a combustion chamber from that at a present state, as a control for preventing the deterioration of a catalyst upon stopping the engine. This makes it possible to prevent the catalyst from being exposed to a lean atmosphere.

7 Claims, 14 Drawing Sheets

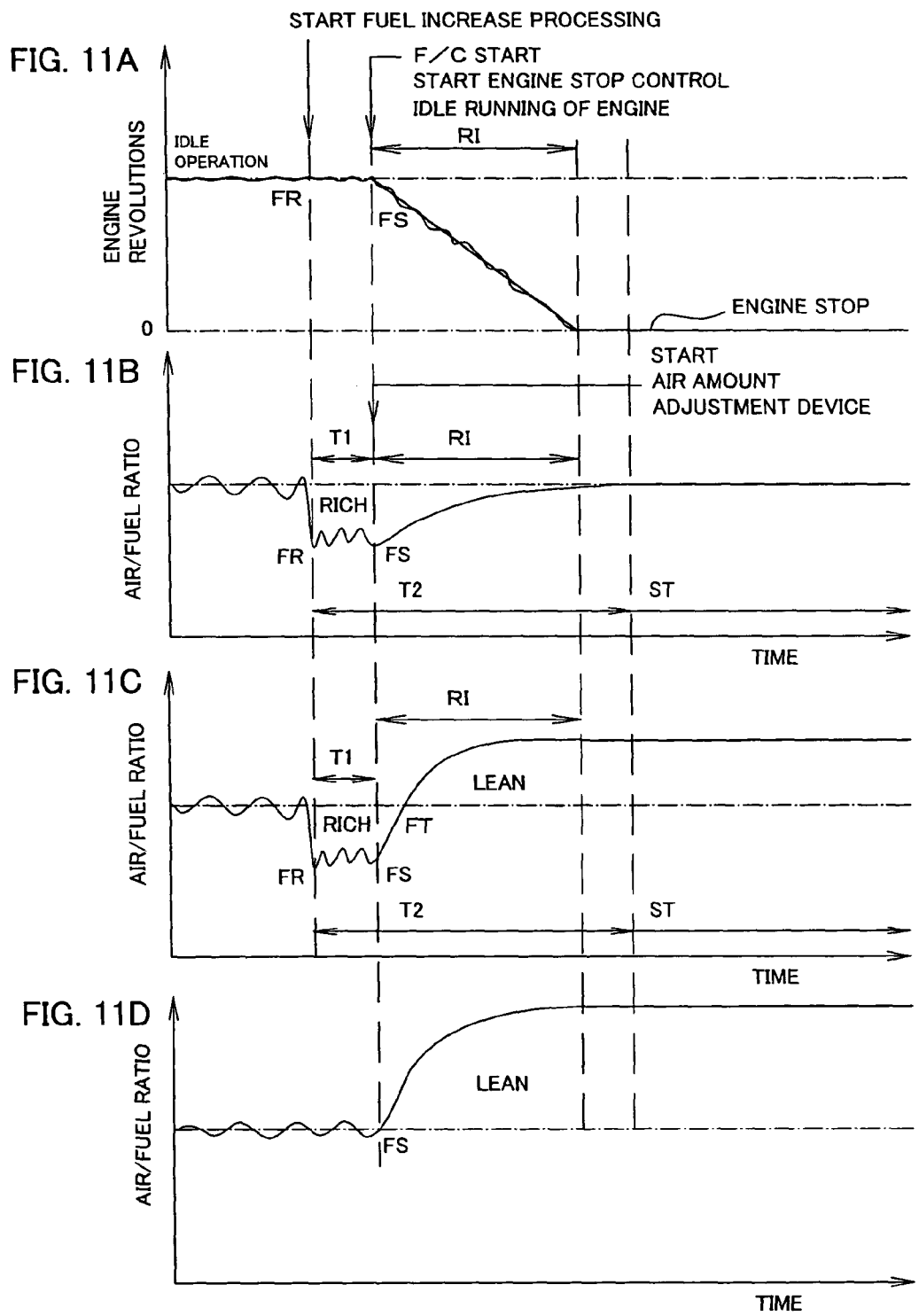

POWER OUTPUT APPARATUS, HYBRID POWER OUTPUT APPARATUS, METHOD OF CONTROLLING THE SAME, AND HYBRID VEHICLE

BACKGROUND OF THE INVENTION

1. Field of the Invention

The present invention relates to a power output apparatus provided with an engine including a combustion chamber or the like, and a hybrid power output apparatus including the engine and a motor generator apparatus. Moreover, the present invention also relates to a method of controlling the engine, a method of controlling the hybrid power output apparatus, and a hybrid vehicle including the above-described hybrid power output apparatus.

2. Description of the Related Art

In order to purify gas emitted from an engine, there is provided an exhaust gas purification apparatus having a suitable catalyst. Such an exhaust gas purification apparatus, and specifically a ternary catalytic apparatus, for example, can remove harmful substances, such as CO, NOx, HC, or the like, and thus does not cause so-called environmental pollution.

In the ternary catalytic apparatus, it is necessary to pay attention to the deterioration of the catalyst. That is because the catalyst deterioration does not allow the apparatus's effective function of removing the harmful substances. It is known that as an atmosphere around the catalyst reaches a higher temperature which is one condition, or oxygen around the catalyst becomes more excessive which is another condition, this catalyst deterioration generally tends to occur more frequently. It is also known that the catalyst deterioration is substantially accelerated if the both conditions occur simultaneously. The latter condition out of them, i.e. to be an atmosphere with excess oxygen, has substantially the same meaning as that an air/fuel mixture becomes lean (i.e. to be in the condition that the amount of air is relatively greater than that of fuel, as compared with an ideal air/fuel ratio), considering that the exhaust gas purification apparatus is mounted on the middle of an exhaust tube directly connected to an engine, which is, in other words, to be a lean atmosphere.

Incidentally, according to one explanation, the reason why the catalyst deterioration occurs in such an atmosphere is considered as follows: platinum particles constituting the catalyst grow greatly in the atmosphere and reduce their surface areas, thereby reducing the opportunity for the exhaust gases to be in contact with the catalyst.

The catalyst deterioration as described above, or the appearance of an environment that promotes this deterioration, may occur frequently. For example, in typical gasoline engines or the like, fuel cut control (or merely referred to as "fuel cut", "F/C", or the like) is sometimes performed in order to improve the fuel consumption, to prevent an excess load, or the like. In this case, the ratio of fuel in the air/fuel mixture decreases and the ratio of air increases, so that the above-described lean atmosphere appears. Therefore, if no countermeasures are taken in this case, that accelerates the catalyst deterioration.

For the purpose of dealing with such a problem, even now there is provided a method of prohibiting the execution of the fuel supply stop control or the like if the temperature of the catalyst is higher than a predetermined value, in order not to expose the catalyst to the lean atmosphere on the premise of typical engines, as shown in Japanese Patent Application Laying Open NO. Hei 8-144814, for example.

Incidentally, it is known that the exhaust gas purification apparatus is also mounted on a so-called hybrid power output apparatus, which has the above-described engine and a motor generator apparatus and is tried to have a functional association between them, as shown in Japanese Patent Application Laying Open NO. Hei 9-47094, Japanese Patent Application Laying Open NO 2000-324615 or the like, for example. In such a hybrid power output apparatus, the control as described in Japanese Patent Application Laying Open NO. Hei 8-144814 can be executed.

However, there are still some insufficient points left in the countermeasure for protecting the catalyst deterioration, as disclosed in the above-described Japanese Patent Application Laying Open NO. Hei 8-144814 or the like. This specifically applies to the above-described hybrid power output apparatus.

In the hybrid power output apparatus of this kind, a battery is charged by using the motor generator apparatus as a generator which is rotated by a driving force of the engine, or by using an exclusive generator included in the motor generator apparatus, which depends on required operating conditions, as occasion demands. Moreover, a drive shaft is rotated independently or together with the engine, by using the motor generator apparatus as a motor, which receives power supply from the battery and rotates, or by using an exclusive motor included in the motor generator apparatus. The power output apparatus of this kind is broadly classified into a parallel hybrid system and a series hybrid system. In the former system, the drive shaft is rotated by one portion of the output of the engine and by a driving force of the motor generator apparatus. In the latter system, the output of the engine is only used for charging by the motor generator apparatus, and the drive shaft is rotated by the driving force of the motor generator apparatus.

In the hybrid power output apparatus as described above, the role of the engine is relatively reduced, so that it is possible to achieve a remarkable effect, such as decreasing the fuel consumption, decreasing the concentration of the harmful substances in the exhaust gases, or the like.

At the same time, however, there is a possibility that an undesired situation may happen in the hybrid power output apparatus from the viewpoint of the catalyst deterioration. This is because the engine is sometimes operated intermittently if the drive shaft is rotated by the cooperation of the motor generator apparatus and the engine, as described above. In this case, the engine is operated such that, after a certain operating period, it enters a down period for the time being, and then again enters an operating period. In this case, especially at a transition time point of transmitting from the operating period to the down period, since fuel injection is once stopped, the amount of air relatively increases. This means that the lean atmosphere appears, so that the catalyst deterioration can be possibly accelerated. Moreover, at the same time point, there is definitely an idle period of the engine, and it is basically impossible to restrict air flow to the exhaust tube due to the idle, so that there is a possibility that a leaner atmosphere may appear.

Furthermore, the above-described intermittent operation is considered to be performed when the engine is warm or when it has a high load, so that the catalyst is exposed even to a high temperature atmosphere. According to this, it can be said that the catalyst deterioration occurs more easily.

As described above, the hybrid power output apparatus may have a problem that it increases the concentration of the harmful substances in the exhaust gases as a result of accelerating the catalyst deterioration at each time of passing through the transition time point of transmitting from the operation period to the down period.

SUMMARY OF THE INVENTION

It is therefore an object of the present invention to provide a power output apparatus and a hybrid power output apparatus which can effectively inhibit the deterioration of a catalyst that possibly occurs when the engine is stopped, and specifically when the engine is intermittently operated or the like, as well as to provide a method of controlling the apparatuses and a hybrid vehicle provided with the above-described hybrid power output apparatus.

The above object of the present invention can be achieved by a first power output apparatus provided with: an engine including a combustion chamber; a fuel supply device for supplying fuel into the combustion chamber; an exhaust gas purification device for purifying gas emitted from the combustion chamber by a catalyst; and a control device for controlling the fuel supply device to perform a fuel supply stop process of stopping supply of the fuel after performing a fuel increase process of increasing an amount of the fuel in the combustion chamber from that at a present state, as a control for preventing deterioration of the catalyst upon stopping the engine.

According to the first power output apparatus of the present invention, it is provided with: the fuel supply device for supplying fuel into the combustion chamber; and the control device for controlling this, and the control device can control the fuel supply device to perform a fuel supply stop process of stopping supply of the fuel after performing a fuel increase process of increasing an amount of the fuel in the combustion chamber from that at a present state, as a control for preventing deterioration of the catalyst upon stopping the engine.

According to this, when the engine is stopped, and specifically at a transition time point of transmitting from an operating period to a down period (i.e., dwell or inactive time) in the intermittent operation of the engine, for example, fuel having a greater amount than that before the transition time point is fed into the combustion chamber. Namely, the ratio of fuel in the air/fuel mixture increases. As a result of this, the gas emitted from the combustion chamber becomes fuel-rich.

Therefore, according to the present invention, the catalyst constituting the exhaust gas purification apparatus for purifying the gas is not exposed to the lean atmosphere. Moreover, this applies to a time point of the idle running of the engine. Namely, even if air is fed into the exhaust tube by this idle running, a risk of exposing the catalyst to the lean atmosphere decreases if a fuel increasing amount by the fuel increase process is appropriate, or if each time point of executing the fuel increase process and a process of stopping the engine is appropriate, or the like.

As described above, according to the present invention, it is possible to effectively prevent the acceleration of the catalyst deterioration.

In one aspect of the first power output apparatus of the present invention, the control device controls the fuel supply device such that a start time point of the fuel supply stop process coincides with a start time point of a process of stopping the engine.

According to this aspect, the fuel supply stop process and the process of stopping the engine are performed at substantially the same time, and therefore the process of stopping the engine is performed after the fuel increase process. According to this, even if the engine runs idle by the execution of the process of stopping the engine and thus a situation becomes such that air is fed into the exhaust tube, gas fed into the exhaust tube is also fuel-rich because the inside of the combustion chamber of the engine has been already in a fuel-rich atmosphere in accordance with this aspect. Consequently, as described above, according to this aspect, it is possible to surely and properly avoid such a situation beforehand that the catalyst is exposed to the lean atmosphere.

Incidentally, the present invention may take a construction of delaying the start time point of the fuel supply stop process from the start time point of the process of stopping the engine, in place of the construction in this aspect, if desired.

In another aspect of the first power output apparatus of the present invention, the control device controls the fuel supply device to perform the fuel increase process depending on a temperature of the catalyst.

According to this aspect, the fuel supply stop process after the fuel increase process associated with the present invention is performed depending on the temperature of the catalyst. This makes it possible to perform such a control that if the temperature of the catalyst is above a predetermined temperature threshold value, the above-described process is performed, and if not, it is not performed, considering that as the catalyst is at the higher temperature, the deterioration accelerates more. As described above, according to this aspect, it is possible to efficiently inhibit the catalyst deterioration.

In this aspect, the control device may be constructed to control the fuel supply device to perform the fuel increase process if the temperature of the catalyst is above a predetermined temperature threshold value.

According to this construction, the fuel supply stop process after the above-described fuel increase process is performed only when the engine is stopped and in the case where the temperature of the catalyst is above the predetermined temperature threshold value. The predetermined temperature threshold value can be specifically set to about 700 degrees Celsius (° C.), for example.

As described above, it is possible to efficiently inhibit the progress of the catalyst deterioration by limiting the execution of the fuel supply stop process after the fuel increase process associated with the present invention to only when the catalyst is at the high temperature.

Moreover, according to this aspect, the above-described series of processes associated with the present invention is not performed if the catalyst is at a relatively low temperature, which means that the fuel increase process is not performed, so that it is possible to save fuel required for the processes by just that much. Incidentally, even if the above-described series of processes associated with the present invention is not performed, the catalyst deterioration is not accelerated because in that case the catalyst is at a relatively low temperature.

Furthermore, according to the fuel supply stop process after the fuel increase process, there is a possibility that transition delay occurs when the engine is stopped (because the fuel is increased once in spite of the stop time), and thus there is a possibility that this influences the movement or the like of a vehicle on which the power output apparatus is mounted. However, according to this aspect, the execution of the process is limited to the case where the catalyst is at a high temperature, so that it is possible to prevent, as much as possible, the occurrence of such a problem.

In another aspect of the first power output apparatus of the present invention, the control device controls the fuel supply device such that a start time point of the fuel supply stop process is after passing two to three seconds from a start time point of the fuel increase process.

According to this aspect, by preferably setting a time length between the start time point of the fuel increase process and the start time point of the fuel supply stop process to be two to three seconds, it is possible to effectively prevent the catalyst deterioration, while avoiding beforehand the transition delay upon stopping the engine and further avoiding the influence on the movement characteristics or the like of a vehicle on which the power output apparatus is mounted. Namely, if the fuel increase process is performed without passing two seconds, it is far to some extent to improve the lean atmosphere, which accelerates the catalyst deterioration, and on the other hand, if the fuel increase process is performed after passing more than three seconds, that greatly influences the transition delay upon stopping the engine.

The above object of the present invention can be achieved by a second power output apparatus provided with: an engine including a combustion chamber; a fuel supply device for supplying fuel into the combustion chamber; an exhaust gas purification device for purifying gas emitted from the combustion chamber by a catalyst; and a control device for controlling the fuel supply device to perform a fuel supply stop process of stopping supply of the fuel to the combustion chamber depending on a temperature of the catalyst and engine revolutions of the engine, as a control for preventing deterioration of the catalyst upon stopping the engine.

According to the second power output apparatus of the present invention, it is provided with: the fuel supply device for supplying fuel into the combustion chamber; and the control device for controlling this, and the control device can control the fuel supply device to perform a fuel supply stop process of stopping supply of the fuel to the combustion chamber depending on a temperature of the catalyst and the engine revolutions of the engine, as a control for preventing deterioration of the catalyst upon stopping the engine.

Here, the term "depending on a temperature of the catalyst and engine revolutions of the engine" specifically and preferably means the case where the temperature of the catalyst is low and the engine revolutions (i.e., the revolution speed or rotational speed) are high, or especially the case where the temperature of the catalyst is high and the engine revolutions are low, or the like. Namely, in the present invention, the fuel supply to the combustion chamber is stopped in these cases.

According to this, firstly, when the catalyst is at the low temperature, the fuel supply is stopped even if the engine revolutions are relatively high (i.e., if the engine revolution speed is relatively high), and secondly, when the catalyst is at the high temperature, the fuel supply is not stopped as long as the engine revolutions do not become relatively low (i.e., as long as the engine revolution speed does not become relatively low). Especially, "the engine revolutions become low" in the latter out of them means that air emissions by the idle running of the engine are reduced, so that even if the fuel supply stop process is performed after reaching such a state, it is possible to prevent beforehand that the catalyst is exposed to the lean atmosphere. In other words, in the present invention, it is possible to avoid the worst situation that the catalyst is exposed to the lean atmosphere in the case where the catalyst is under an environment with the high temperature, that is, in the case where it is already concerned that the catalyst deterioration is accelerated, as one bad situation followed another. By virtue of this, it is possible to prevent, as much as possible, the acceleration of the catalyst deterioration even by the prevent invention.

Incidentally, the fuel supply stop process is performed depending on the catalytic temperature and the engine revolutions in the present invention, but in some cases, the process is performed depending only on the latter factor, i.e. the engine revolutions.

In one aspect of the second power output apparatus in the present invention, the control device controls the fuel supply device to perform the fuel increase process if the engine revolutions are below a predetermined engine revolutions threshold value.

According to this aspect, the fuel supply stop process is performed if the engine revolutions are below the predetermined engine revolutions threshold value. Therefore, if the engine revolutions threshold value is preferably set, the fuel supply is stopped when the engine revolutions decrease sufficiently and thus only a relatively small amount of air is fed into the exhaust tube, so that a risk of exposing the catalyst to the lean atmosphere decreases remarkably.

Incidentally, in addition to this aspect which focuses on the engine revolutions, if taking an aspect in which the fuel supply stop process is performed only if the temperature of the catalyst is above a predetermined temperature threshold value (i.e. an aspect in which the fuel supply stop process is performed only if the engine revolutions are below a predetermined value and the catalytic temperature is above a predetermined value), it is possible to prevent, as much as possible, the acceleration of the catalyst deterioration, as described above.

In another aspect of the second power output apparatus in the present invention, the control device controls the fuel supply device to perform the fuel supply stop process after performing a fuel increase process of increasing an amount of the fuel in the combustion chamber from that at a present state, upon stopping the engine.

According to this aspect, in addition to the execution of the fuel supply stop process after the fuel increase process, which is a feature of the above-described first power output apparatus of the present invention, the execution of the fuel supply stop process is associated with the engine revolutions after the execution of the process of stopping the engine. In other words, this is an aspect having both constructions of the first and second power output apparatuses of the present invention. Therefore, an atmosphere around the catalyst can be made fuel-richer, and thus it is possible to inhibit the progress of the catalyst deterioration more.

The above object of the present invention can be achieved by a third power output apparatus provided with: an engine including a combustion chamber; a fuel supply device for supplying fuel into the combustion chamber; an exhaust gas purification device for purifying gas emitted from the combustion chamber by a catalyst; and a control device for controlling at least the fuel supply device such that a ratio of fuel in an atmosphere around the catalyst is greater than a ratio of air in the atmosphere, as a control for preventing deterioration of the catalyst upon stopping the engine.

According to the third power output apparatus of the present invention, it is provided with: the fuel supply device for supplying fuel into the combustion chamber; and the control device for controlling this, and the control device can control at least the fuel supply device such that a ratio of fuel in an atmosphere around the catalyst is greater than a ratio of air in the atmosphere, as a control for preventing deterioration of the catalyst upon stopping the engine.

According to this, when the engine is stopped, the atmosphere around the catalyst is controlled to be fuel rich. This makes it possible to prevent the catalyst from being exposed to the lean atmosphere. Therefore, it is also possible to prevent the catalyst deterioration by the present invention.

Incidentally, in order to control the air/fuel ratio in this manner, the control device may control an intake device for supplying air into the combustion chamber, for example, if needed, in addition to controlling the fuel supply device.

The above object of the present invention can be achieved by a fourth power output apparatus provided with: an engine including a combustion chamber; a fuel supply device for supplying fuel into the combustion chamber; an exhaust gas purification device for purifying gas emitted from the combustion chamber by a catalyst; an air amount adjustment device for adjusting an air amount flowed into the catalyst; and a control device for controlling the fuel supply device to perform a fuel supply stop process of stopping supply of the fuel and for controlling the air amount adjustment device to reduce the air amount flowed into the catalyst, if temperature of the catalyst is above a predetermined temperature threshold value as a control for preventing deterioration of the catalyst upon stopping the engine.

According to the fourth power output apparatus of the present invention, it is provided with: the fuel supply device for supplying fuel into the combustion chamber; and the control device for controlling this. This control device controls the fuel supply device to perform the above-described fuel supply stop process and also controls the air amount adjustment device, such as an idle speed control (ISC) valve, to adjust an air amount, as a control for preventing the deterioration of the catalyst. By making air that is fed into the exhaust tube by the idle running of the engine have a relatively small amount and further making it stay on the upper stream side than the catalyst by using the air amount adjustment device, it is possible to remarkably reduce a risk of exposing the catalyst to the lean atmosphere and prevent the catalyst deterioration more effectively and as much as possible.

More specifically, for example, under the control of the control device, the ISC valve for adjusting an air amount in the idle operation, which is one example of the air amount adjustment device in an intake system and which is placed on an intake passage for bypassing a throttle valve, is closed and the close timing of an intake valve is delayed (retarded) by a variable valve timing (VVT) mechanism, which is another example of the air amount adjustment device in the intake system. This makes it possible to make air that is supplied into the combustion chamber have a relatively small amount. Alternatively, in addition to or in place of this, a motor generator, which is another example of the air amount adjustment device in the intake system, is regenerated. This reduces the engine revolutions. By virtue of these, it is possible to make air that is fed into the exhaust tube by the idle running of the engine have a relatively small amount.

Moreover, under the control of the control device, a valve in an exhaust system, such as a not-illustrated exhaust gas re-circulation (EGR) valve placed on the downstream of the exhaust tube, which is one example of the air amount adjustment device in the exhaust system, may be closed. This increases the pressure in the exhaust tube. Alternatively, in addition to or in place of this, the amount of opening of an exhaust throttle valve, which is another example of the air amount adjustment device in the exhaust system, may be secured. This makes it possible to re-circulate air inside the engine. By virtue of these, it is possible to make air that is fed into the exhaust tube by the idle running of the engine stay on the upper stream side than the catalyst.

From the above, a risk of exposing the catalyst to the lean atmosphere decreases remarkably.

According to the fourth power output apparatus, the air amount adjustment device adjusts an air amount flowed into the catalyst by making air that is fed into the exhaust tube by the idle running of the engine have a relatively small amount and making it stay on the upper stream side than the ternary catalytic apparatus, so that it is possible to inhibit, as much as possible, that air is compulsively fed into by the idle running of the engine and thereby the air/fuel ratio inevitably increases.

Especially, according to the fourth power output apparatus, the above-described series of processes associated with the present invention is not performed if the catalyst is at a relatively low temperature. Incidentally, even if the above-described series of processes is not performed as described above, that does not mean the progress of the catalyst deterioration because in that case the catalyst is at a relatively low temperature. On the other hand, the series of processes is performed if the temperature of the catalyst is above a predetermined temperature threshold value, considering that as the catalyst is at a higher temperature, the deterioration accelerates more. As described above, according to this aspect, it is possible to inhibit the catalyst deterioration more efficiently.

From the above, it is possible to prevent the catalyst deterioration more efficiently, effectively, and as much as possible.

In one aspect of the fourth power output apparatus of the present invention, the control device controls the fuel supply device to perform the fuel supply stop process after performing a fuel increase process of increasing an amount of the fuel in the combustion chamber from that at a present state.

According to this aspect, the control device controls the fuel supply device to perform the fuel supply stop process after performing the above-described fuel increase process to make the air/fuel mixture fuel-rich and controls the air amount adjustment device to adjust an air amount, as a control for preventing the catalyst deterioration upon stopping the engine.

Namely, the air amount adjustment device not only can make air that is compulsively fed into the exhaust tube by the idle running of the engine have a relatively small amount and make it stay on the upper stream side than the ternary catalytic apparatus, but also can perform the fuel increase process before the process of stopping the engine to reduce the air/fuel ratio in advance.

Moreover, according to this aspect, the above-described series of processes associated with this aspect is not performed if the catalyst is at a relatively low temperature, which means that the fuel increase process is not performed, so that it is possible to save fuel required for the process by just that much. Incidentally, even if the above-described series of processes associated with the present invention is not performed, the catalyst deterioration is not accelerated because in that case the catalyst is at a relatively low temperature.

Furthermore, according to the fuel supply stop process after the fuel increase process, there is a possibility that transition delay occurs when the engine is stopped (because the fuel is increased once in spite of the stop time), and thus there is a possibility that this influences the movement or the like of a vehicle on which the power output apparatus is mounted. However, according to this aspect, the execution of the process is limited to the case where the catalyst is at the high temperature, so that it is possible to prevent, as much as possible, the occurrence of such a problem.

The above object of the present invention can be achieved by a fifth power output apparatus provided with: an engine including a combustion chamber; a fuel supply device for supplying fuel into the combustion chamber; an exhaust gas purification device for purifying gas emitted from the combustion chamber by a catalyst; an air amount adjustment device for adjusting an air amount flowed into the catalyst; and a control device for controlling the fuel supply device to perform a fuel supply stop process of stopping supply of the fuel after performing a fuel increase process of increasing an amount of the fuel in the combustion chamber from that at a present state and for controlling the air amount adjustment device to reduce the air amount flowed into the catalyst, as a control for preventing deterioration of the catalyst upon stopping the engine.

According to the fifth power output apparatus of the present invention, it is provided with: the fuel supply device for supplying fuel into the combustion chamber; and the control device for controlling this. This control device controls the fuel supply device to perform the above-described fuel supply stop process after performing the above-described fuel increase process to make the air/fuel mixture fuel-rich and controls the air amount adjustment device, such as the above-described ISC valve, to adjust an air amount, as a control for preventing the deterioration of the catalyst upon stopping the engine. By making air that is fed into the exhaust tube by the idle running of the engine have a relatively small amount and further making it stay on the upper stream side than the catalyst by using the air amount adjustment device, it is possible to remarkably reduce a risk of exposing the catalyst to the lean atmosphere and prevent the catalyst deterioration more effectively and as much as possible.

Especially, according to the fifth power output apparatus, not only the air/fuel ratio is reduced in advance by performing the fuel increase process before the process of stopping the engine, but also the air amount adjustment device adjusts an air amount flowed into the catalyst, so that it is possible to inhibit, as much as possible, that air is compulsively fed into the by the idle running of the engine and thereby the air/fuel ratio inevitably increases.

In another aspect of the first, second, fourth, or fifth power output apparatus of the present invention, it is further provided with: an oxygen concentration sensor for measuring or estimating the concentration of oxygen in an exhaust system in an upstream of the catalyst; and an air/fuel ratio memory device for memorizing an air/fuel ratio in the exhaust system when the engine is stopped, the control device controlling the fuel supply device to correct a fuel increasing amount in the fuel increase process by feedback-learning such an air/fuel ratio at a previous or past stop time of the engine that is memorized by the air/fuel ratio memory device.

According to this aspect, developing more deeply the correction of a fuel injection amount in normal operation, a fuel increasing amount is corrected depending on experimental or estimated values of the air/fuel ratio (A/F) that is substantially or completely constant, which are measured or estimated by the oxygen concentration sensor, an air/fuel ratio sensor, or the like, at a previous or past stop time of the engine. Namely, a fuel increasing amount in the fuel increase process before the engine stop is corrected by feedback-learning in which the experimental or estimated values of the air/fuel ratio are used as input information, thereby realizing accurate air/fuel ratio control upon stopping the engine. Therefore, it is possible to remarkably reduce a risk of exposing the catalyst to the lean atmosphere and prevent the catalyst deterioration more effectively. Here, the correction of a fuel increasing amount is to correct a fuel increasing amount set with respect to the fuel injection amount primarily determined from the engine revolutions and the load of the engine in order to cancel the air/fuel ratio variation. More specifically, the correction of a fuel increasing amount is to correct by feedback-learning in which the experimental or estimated values of the air/fuel ratio, which are measured or estimated by the oxygen concentration sensor, the air/fuel ratio sensor, or the like, are used as the input information. Specifically, if the air/fuel ratio deviates from a desired value to the lean side, the fuel increasing amount is corrected to be on the increase side. Incidentally, the desired value of the air/fuel ratio may be within an appropriate range from "10" to "20". On the other hand, if the air/fuel ratio deviates from a desired value to the rich side, the fuel increasing amount is corrected to be on the decrease side. If the air/fuel ratio is the desired value, any correction is not performed.

Especially, according to this aspect, as opposed to the normal operation, there is such a distinctive feature that accurate air/fuel ratio control upon stopping the engine can be realized without any influence by the air/fuel ratio variation in the idle operation or in the idle running of the engine in which there are normally unexpected factors.

Specifically, in the idle operation, the fuel injection amount and an intake air amount are relatively small, as compared with those in the normal operation respectively. Generally, the amount of fuel included in the actual air/fuel mixture is influenced by the adhesive amount of fuel adhering to a fuel injection valve (the amount of deposit fuel), the temperature and applied voltage of the fuel injection valve, or the like. As the fuel injection amount becomes smaller, it is influenced more easily, so the correction alone of a fuel increasing amount in the fuel increase process, which is performed by the correction of the fuel injection amount in the normal operation described above, cannot cancel the air/fuel ratio variation because there arises a big difference between the amount of fuel included in the desired air/fuel mixture and the amount of fuel included in the actual air/fuel mixture, so that it is difficult or not possible to realize accurate air/fuel ratio control. In the same manner, it is difficult or not possible to realize the air/fuel ratio control because fuel is not injected in the idle running of the engine. If the above-described correction of a fuel injection amount is performed, it is insufficient to cancel the air/fuel ratio variation because there are different factors from those in the normal operation. For example, in a direct injection gasoline engine, fuel leaked from the fuel injection valve is flowed into the exhaust system. This fuel leaked from the fuel injection valve is unevenly distributed and its amount changes with the passage of time. On the other hand, in a port injection gasoline engine, fuel adhering to a port is flowed into the exhaust system because the fuel injection valve is placed at the port. This amount of fuel adhering to the port is influenced by the fuel adhesive amount of the port and that of an intake valve, but the fuel adhesive amount always changes with the passage of time.

According to this aspect, without any influence by the air/fuel ratio variation, which is caused by the fact that the actual amount of fuel included in the air/fuel mixture changes with the passage of time because of normally unexpected factors, a fuel increasing amount in the fuel increase process before the engine stop is corrected by the feedback-learning in which the experimental or estimated values of the air/fuel ratio are used as the input information, thereby realizing accurate air/fuel ratio control upon stopping the engine. Therefore, it is possible to remarkably reduce a risk of exposing the catalyst to the lean atmosphere and prevent the catalyst deterioration more effectively.

Incidentally, according to this aspect, the air/fuel ratio does not become excessively rich when fuel increases and subsequently when the engine is stopped, so that the emissions of HC and CO hardly increase or do not increase at all when fuel increases and when the engine is restarted.

In another aspect of the first, second, fourth, or fifth power output apparatus of the present invention, it is further provided with an announcement device for announcing to a driver if a fuel increasing amount in the fuel increase process is greater than a predetermined upper value or less than a predetermined lower value.

According to this aspect, in such air/fuel ratio control that accurate air/fuel control upon stopping the engine is realized by correcting a fuel increasing amount in the fuel increase process before the engine stop depending on the air/fuel ratio at the previous or past engine stop time, it is judged whether the fuel increasing amount in the fuel increase process is within a predetermined range of threshold values, and on the basis of the judgment, failures in the exhaust and intake systems can be detected and announced to a driver. Here, the term "the failures in the exhaust and intake systems" means exhaust gas leakage or air inflow caused from small cracks or the like in the exhaust system, and the increase of the fuel adhesive amount (the amount of deposit fuel) or fuel leakage from the fuel injection valve in the intake system. Specifically, it means exhaust gas leakage on the upstream of the catalyst or air inflow which is caused from small cracks of the exhaust tube or the like or which is caused from imperfect sealing or the like at the attached portion of the oxygen concentration sensor, and it means the increase of the fuel adhesive amount of fuel adhering to an intake port and an intake valve, or the staying of fuel, which is leaked at the inactive time of the fuel injection valve, in the exhaust system.

In this judgment, specifically if the fuel increasing amount in the fuel increase process is greater than the predetermined upper threshold value, it is detected that there is the leakage caused from small cracks or the like in the exhaust system. On the other hand, if the fuel increasing amount in the fuel increase process is less than the predetermined lower threshold value, it is detected that the fuel adhesive amount increases in the intake system or that there is the leakage of fuel from the fuel injection valve.

More specifically, it is possible to detect a failure in the exhaust system, such as imperfect sealing, which cannot be detected in the normal operation of the engine, by applying the air/fuel ratio control. Specifically, even if there is a failure, such as small cracks and imperfect sealing, that does not influence the air/fuel ratio because air is not flowed into the exhaust system in the normal operation of the engine, so that it is not possible to detect the failure by the oxygen concentration sensor or the like, for example. Moreover, because an exhaust sound in the presence of a failure, such as imperfect sealing, is the same as that in the normal operation, a driver obviously cannot realize their difference. On the other hand, in the idle operation or the idle running of the engine, the fuel injection amount and the intake air amount are relatively small, as compared with those in the normal operation, or fuel is not injected. Here, if air/fuel ratio control beyond the feedback-learning is performed, it is possible to detect that failures are occurring in the exhaust and intake systems.

As a result, when the air/fuel ratio becomes excessively lean (which means a high degree of the lean), not only the fuel increasing amount is increased by the air/fuel ratio control, but also, if this fuel increasing amount is greater than the predetermined upper threshold value, the air/fuel ratio control beyond the feedback-learning is performed, so that it is detected that there is a failure in the exhaust system, such as imperfect sealing. This makes it possible to prevent beforehand air pollution caused by the exhaust gases releasing into the air, which do not pass through the catalyst in the normal operation of the engine. More specifically, the catalyst has a purification percentage of 99.9% or more, so that even if 0.1% exhaust gases are released into the air without passing through the catalyst, it is possible to avoid the worst situation that HC, CO, or NOx which is twice or more as much as that in a normal vehicle is released.

In the same manner, when the air/fuel ratio becomes excessively rich (which means a high degree of the rich), not only the fuel increasing amount is decreased by the air/fuel ratio control, but also, if this fuel increasing amount is less than the predetermined lower threshold value, the air/fuel ratio control beyond the feedback-learning is performed, so that it is detected that there is a failure in the intake system, such as the leakage of fuel from the fuel injection valve. This makes it possible to prevent beforehand air pollution, the deterioration of a catalytic purification percentage, or the like. Specifically, in the direct injection gasoline engine, when the engine is stopped for a long time, the fuel, which is leaked at the inactive time of the fuel injection valve, stays in the exhaust system, and this fuel is released into the air without the purification by the catalyst when the engine is started at a cool temperature. However, the detection of this failure makes it possible to prevent air pollution beforehand. On the other hand, in the port injection gasoline engine, if the adhesive amount of fuel adhering to an intake port and an intake valve increases, it becomes lean when the engine is accelerated, or it becomes rich when the engine is decelerated, thereby deteriorating the catalytic purification percentage. However, the detection of this failure makes it possible to prevent this deterioration beforehand.

As described above, it is judged whether the fuel increasing amount, which is corrected in the air/fuel ratio control, is within the predetermined range of threshold values, and on the basis of the judgment result, failures in the exhaust and intake systems are detected and announced to a driver, so that it is possible to prevent beforehand air pollution, the deterioration of the catalytic purification percentage, or the like.

The above object of the present invention can be achieved by a hybrid power output apparatus in the above-described first, second, third, fourth, or fifth power output apparatus (including their various aspects), it is further provided with: a motor generator apparatus which can generate electric power by using at least one portion of the output of the engine and which can output a driving force through a drive shaft.

According to the hybrid power output apparatus of the present invention, it is provided with the motor generator apparatus which generates electric power by the output of the engine and which outputs a driving force through a drive shaft. According to the latter characteristic out of them, the rotation of the drive shaft is realized by the motor generator apparatus, and it can be also realized by the above-described engine (which is the parallel hybrid system), so that even if the output of the engine is low, it is possible to obtain a sufficient driving force with the assistance by a motor constituting the motor generator apparatus. According to the former characteristic (which is the generating of electric power), it is possible to realize battery charging by using the output of the engine, so that it is possible to realize the application of the driving force by the motor constituting the motor generator apparatus with respect to the drive shaft for a relatively long period without a necessity for providing a special charging period (which is the series hybrid system).

In any case, by relatively reducing the role of the engine which emits the exhaust gases, it is possible to provide a power output apparatus which inhibits a fuel consumption amount and which does not cause so-called environmental pollution.

In one aspect of the hybrid power output apparatus of the present invention, the engine performs intermittent operation, and the stop time of the engine includes a transition time point from an operating period to a down period in the intermittent operation.

According to this aspect, the engine performs the intermittent operation. Namely, the engine is operated such that, after a certain operating period, it enters a down period for the time being, and then again enters an operating period. According to this, it is possible to inhibit the fuel consumption in the engine, and because the absolute quantity of exhaust gases from the engine reduces, it is possible to reduce the absolute quantity of the harmful substances emitted to the outside.

By the way, in this case, the transition from an operating period to a down period in the engine, or the reverse transition, is generally performed many times during an operating time of the power output apparatus as a whole. According to this, the catalyst deterioration could be accelerated by the many times from the logic described in the Description of the Related Art.

However, especially in this aspect, the stop time of the engine includes a transition time point from an operating period to a down period in the intermittent operation. Namely, at this transition time point, the fuel supply stop process after the fuel increase process associated with the present invention, or the fuel supply stop process after decreasing the engine revolutions, is performed, so that even if the transition time point is performed many times, that does not accelerate the catalyst deterioration by just that much.

The above object of the present invention can be achieved by a first method of controlling an engine which includes a combustion chamber, provided with: a fuel increase process of increasing an amount of fuel in the combustion chamber from that at a present state upon stopping the engine; and a fuel supply stop process of stopping supply of the fuel after the fuel increase process upon stopping the engine.

According to the first method of controlling an engine of the present invention, the fuel supply stop process is performed after the fuel increase process, so that it is possible to prevent, as much as possible, the progress of the catalyst deterioration without exposing the catalyst to the lean atmosphere, as with the above-described first power output apparatus of the present invention.

The above object of the present invention can be achieved by a second method of controlling an engine which includes a combustion chamber, provided with a fuel supply stop process of stopping supply of fuel to the combustion chamber, depending on a temperature of a catalyst for purification of gas emitted from the combustion chamber and engine revolutions of the engine, upon stopping the engine.

According to the second method of controlling an engine of the present invention, if the temperature of the catalyst is high and the engine revolutions are low, the fuel supply stop process is performed, so that it is possible to avoid the worst situation that the catalyst is exposed to the lean atmosphere under an environment with the high temperature in which the catalyst deterioration is accelerated easily, as one bad situation followed another, as with the above-described second power output apparatus of the present invention. By virtue of this, it is possible to prevent, as much as possible, the acceleration of the catalyst deterioration even by the prevent invention.

The above object of the present invention can be achieved by a third method of controlling an engine which includes a combustion chamber, provided with: a process of increasing a ratio of fuel in an atmosphere around a catalyst with respect to a ratio of air in the atmosphere upon stopping the engine.

According to the third method of controlling an engine of the present invention, the process of increasing a ratio of fuel in an atmosphere around a catalyst with respect to a ratio of air in the atmosphere is performed, so that it is possible to prevent, as much as possible, the progress of the catalyst deterioration without exposing the catalyst to the lean atmosphere, as with the above-described third power output apparatus of the present invention.

The above object of the present invention can be achieved by a fourth method of controlling an engine which includes a combustion chamber, provided with: a fuel supply stop process of stopping supply of fuel upon stopping the engine if a temperature of a catalyst is above a predetermined temperature threshold value; and a process of decreasing an air amount flowed into the catalyst along with the fuel supply stop process.

According to the fourth method of controlling an engine of the present invention, if the temperature of the catalyst is high, the process of decreasing an air amount flowed into the catalyst is performed along with the fuel supply stop process, so that it is possible to avoid the worst situation that the catalyst is exposed to the lean atmosphere under an environment with the high temperature in which the catalyst deterioration is accelerated easily, as one bad situation followed another, as with the above-described fourth power output apparatus of the present invention. By virtue of this, it is possible to prevent, as much as possible, the acceleration of the catalyst deterioration even by the present invention.

The above object of the present invention can be achieved by a fifth method of controlling an engine which includes a combustion chamber, provided with: a fuel increase process of increasing an amount of fuel in the combustion chamber from that at a present state upon stopping the engine; a fuel supply stop process of stopping supply of the fuel after the fuel increase process; and a process of decreasing an air amount flowed into a catalyst along with the fuel supply stop process.

According to the fifth method of controlling an engine of the present invention, after the fuel increase process, the process of decreasing an air amount flowed into a catalyst is performed along with the fuel supply stop process, so that it is possible to remarkably reduce a risk of exposing the catalyst to the lean atmosphere and prevent the progress of the catalyst deterioration more effectively and as much as possible, as with the above-described fifth power output apparatus of the present invention.

The above object of the present invention can be achieved by a hybrid vehicle provided with: the above-described hybrid power output apparatus of the present invention (including its various aspects); a vehicle main body on which the hybrid power output apparatus is mounted; and wheels mounted on the vehicle main body and driven by a driving force outputted through a drive shaft.

According to the hybrid vehicle of the present invention, it is provided with the above-described hybrid power output apparatus of the present invention, so that it is possible to inhibit the catalyst deterioration.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 7A to FIG. 7C are graphs showing how engine revolutions and the air/fuel ratio change by the proceeding steps shown in FIG. 6, in which FIG. 7A shows the change in the engine revolutions with the passage of time, FIG. 7B shows the change in the air/fuel ratio depending on the passage of time, and FIG. 7C shows the change in the air/fuel ratio as a comparison example to FIG. 7B;

FIG. 9A and FIG. 9B are graphs showing how the engine revolutions and the air/fuel ratio change by the proceeding steps shown in FIG. 8, in which FIG. 9A shows the change in the engine revolutions with the passage of time, and FIG. 9B shows the change in the air/fuel ratio depending on the passage of time;

FIG. 11A to FIG. 11D are graphs showing how the engine revolutions and the air/fuel ratio change by the proceeding steps shown in FIG. 10, in which FIG. 11A shows the change in the engine revolutions with the passage of time, FIG. 11B shows the change in the air/fuel ratio depending on the passage of time, and each of FIG. 11C and FIG. 11D shows the change in the air/fuel ratio as a comparison example to FIG. 11B;

FIG. 13A to FIG. 13D are graphs showing how the engine revolutions and the air/fuel ratio change by the proceeding steps shown in FIG. 12, in which FIG. 13A shows the change in the engine revolutions with the passage of time, FIG. 13B shows the change in the air/fuel ratio depending on the passage of time in a lean air/fuel ratio, FIG. 13C shows the change in the air/fuel ratio depending on the passage of time in an ideal air/fuel ratio, and FIG. 13D shows the change in the air/fuel ratio depending on the passage of time in a fuel-rich air/fuel ratio;

FIG. 15A to FIG. 15D are graphs showing how the engine revolutions and the air/fuel ratio change by the proceeding steps shown in FIG. 14, in which FIG. 15A shows the change in the engine revolutions with the passage of time, FIG. 15B shows the change in the air/fuel ratio depending on the passage of time in an excessively lean air/fuel ratio, FIG. 15C shows the change in the air/fuel ratio depending on the passage of time in the ideal air/fuel ratio, and FIG. 15D shows the change in the air/fuel ratio depending on the passage of time in an excessively fuel-rich air/fuel ratio.

DETAILED DESCRIPTION OF THE PREFERRED EMBODIMENTS

The embodiments of the present invention will be hereinafter explained on the basis of the drawings. In the embodiments described below, a hybrid power output apparatus associated with the present invention is applied to a hybrid vehicle in the parallel hybrid system. Moreover, a method of controlling a power output apparatus associated with the present invention is performed in the hybrid vehicle.

(Basic Construction and Operations of Hybrid Vehicle)

Figure 1:
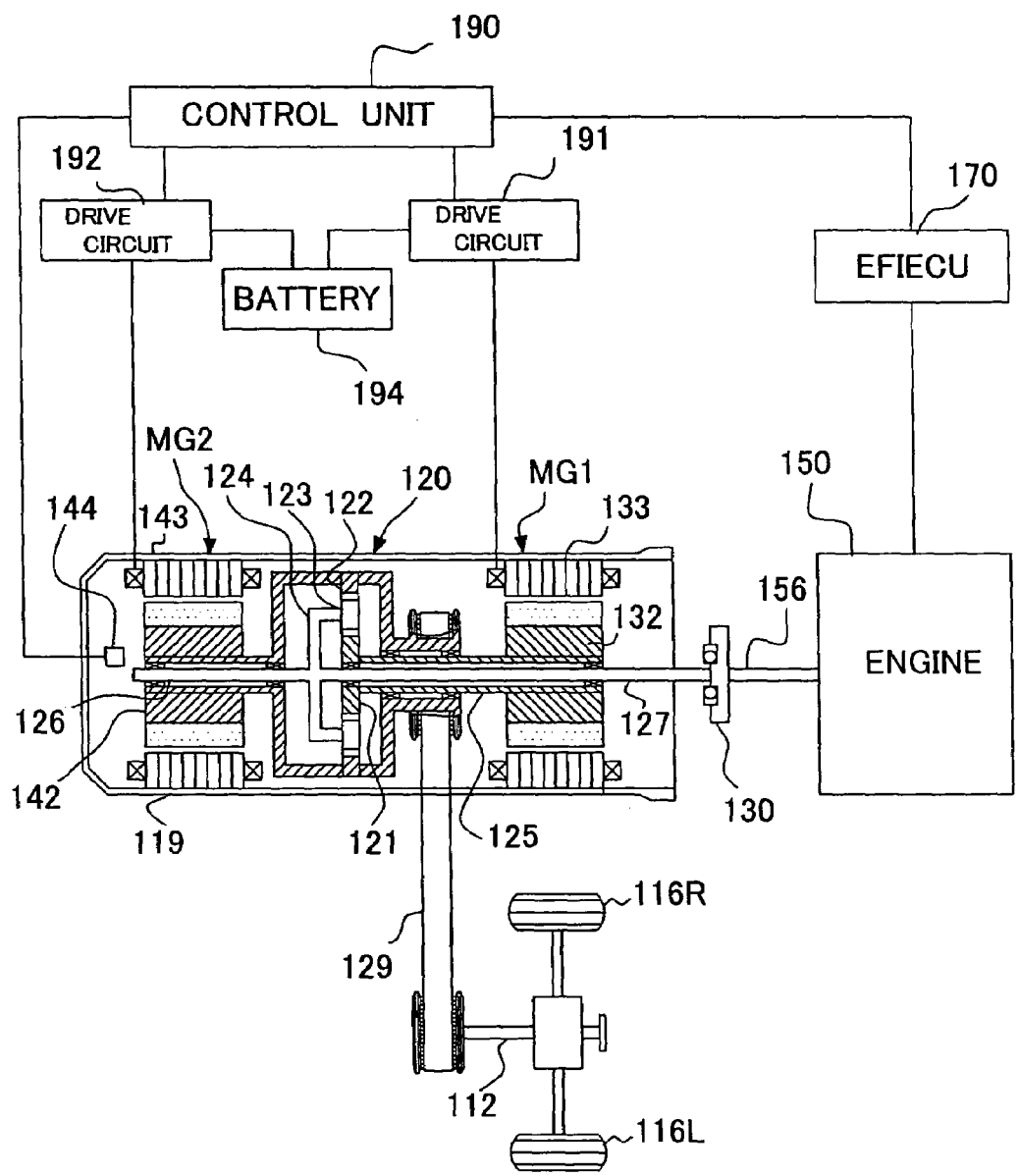
FIG. 1 is a block diagram of a power system of a hybrid vehicle in an embodiment of the present invention.

Firstly, the construction of the hybrid vehicle in this embodiment will be explained with reference to FIG. 1. FIG. 1 is a block diagram of a power system of the hybrid vehicle in this embodiment.

In FIG. 1, the power system of the hybrid vehicle in the embodiment is provided with: an engine 150; motor generators MG1 and MG2, which constitute one example of the motor generator apparatus; drive circuits 191 and 192 for respectively driving the motor generator apparatuses MG1 and MG2; a control unit 190 for controlling the drive circuits 191 and 192; and an Electrical Fuel Injection Engine Control Unit (EFIECU) 170 for controlling the engine 150.

In the embodiment, the engine 150 is a gasoline engine. The engine 150 rotates a crankshaft 156. The operation of the engine 150 is controlled by the EFIECU 170. The EFIECU 170 is a one-chip microcomputer having therein a Central Processing Unit (CPU), a Read Only Memory (ROM), a Random Access Memory (RAM), or the like. The CPU follows programs recorded on the ROM and controls the fuel injection amount and the rotational speed of the engine 150, and so on. In order to enable these controls, various sensors for indicating the operating condition of the engine 150 are connected to the EFIECU 170, which are not illustrated.

The motor generators MG1 and MG2 are constructed as a synchronous motor generator, and are provided with: rotors 132 and 142, which have a plurality of permanent magnets on their outer circumferential surfaces; and stators 133 and 143, each wound with a three-phase coil which forms a rotating magnetic field. The stator 133 and 143 are fixed to a case 119. The three-phase coils with which the stators 133 and 143 of the motor generators MG1 and MG2 are wound are connected to a battery 194 through the drive circuits 191 and 192, respectively.

The drive circuits 191 and 192 are transistor inverters, each provided with a pair of transistors as switching elements for each phase. The drive circuits 191 and 192 are independently connected to the control unit 190. When the transistors of the drive circuits 191 and 192 are switched by control signals from the control unit 190, an electric current flows between the battery 194 and the motor generators MG1 and MG2.

Each of the motor generators MG1 and MG2 can operate as a motor which receives power supply from the battery 194 to rotate and drive (this operating condition is hereinafter referred to as "powering" as occasion demands). Alternatively, each of them can function as a generator which generates electromotive forces between the both ends of the three-phase coil to charge the battery 194 if the rotors 132 and 142 are rotated by an external force (this operating condition is hereinafter referred to as "regeneration" as occasion demands).

The engine 150 and the motor generators MG1 and MG2 are mechanically connected through a planetary gear 120. The planetary gear 120 has three rotating shafts, each connected to the relative one of the gears described below. The gears constituting the planetary gear 120 are: a sun gear 121 which rotates in the center; a planetary pinion gear 123 which revolves around the sun gear 121 while rotating on its own axis; and a ring gear 122 which rotates at the outer circumference. The shaft of the planetary pinion gear 123 is rotatably supported by a planetary carrier 124. In the hybrid vehicle in the embodiment, the crankshaft 156 of the engine 150 is connected to a planetary carrier shaft 127 through a damper 130. The damper 130 is provided in order to absorb torsional vibration generated on the crankshaft 156. The rotor 132 of the motor generator MG1 is connected to a sun gear shaft 125. The rotor 142 of the motor generator MG2 is connected to a ring gear shaft 126. The rotation of the ring gear 122 is transmitted through a chain belt 129 to a drive shaft 112, and further to wheels 116R and 116L.

Next, the operations in the power system of the hybrid vehicle in the embodiment as constructed above will be explained.

Firstly, the operation of the planetary gear 120 will be explained with reference to FIG. 2 and FIG. 3.

The planetary gear 120 has such a characteristic that when the number of revolutions and torque (both of which are collectively referred to as "a rotational state" hereinafter as occasion demands) of two out of the above-described three rotating shafts are determined, the rotational state of the remaining rotating shaft is determined. Although the relationship among the rotational states of the rotating shafts can be obtained by an equation known in mechanics, it can be also obtained geometrically with a diagram that is referred to as a nomogram.

Figure 2:
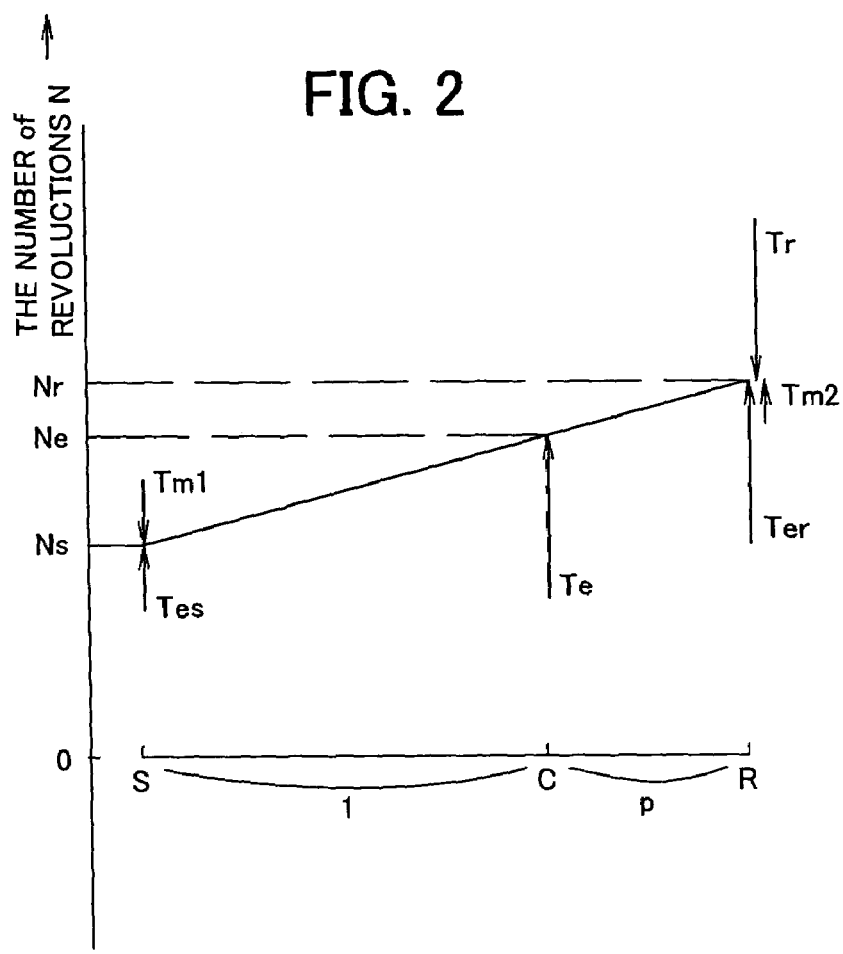
FIG. 2 is a nomogram for the explanation of basic operations of the hybrid vehicle in the embodiment.

One example of the nomogram is shown in FIG. 2. The vertical axis indicates the number of revolutions of each of the rotating shafts. The horizontal axis indicates the gear ratio of each gear by using a distance relationship. The sun gear shaft 125 (a position S in FIG. 2) and the ring gear shaft 126 (a position R in FIG. 2) are taken at both ends, and then a position C which divides a line segment between the position S and the position R in the ratio of 1:$\rho$ is taken as the position of the planetary carrier shaft 127. The $\rho$ is a ratio of the number of teeth of the sun gear 121 to the number of teeth of the ring gear 122. For the positions S, C, and R, as defined in this manner, the numbers of revolutions Ns, Nc, and Nr of the rotating shafts of the gears are respectively plotted. The planetary gear 120 has such a characteristic that the three points plotted in this manner are definitely aligned on a straight line. This straight line is referred to as a dynamic collinear line. The dynamic collinear line is determined when two points are primarily determined. Therefore, by using the dynamic collinear line, it is possible to obtain the number of revolutions of the remaining rotating shaft from the numbers of revolutions of two out of the three rotating shafts.

The planetary gear 120 also has such a characteristic that when the torque of each rotating shaft is replaced by and shown with a force acting on the dynamic collinear line, the dynamic collinear line is in balance as a rigid body. As a concrete example, it is assumed that torque acting on the planetary carrier shaft 127 is Te. In this case, as shown in FIG. 2, a force with magnitude corresponding to the torque Te is acted on the dynamic collinear line vertically upward at the position C. The direction in which the force is acted on is determined depending on the direction of the torque Te. Moreover, torque Tr outputted from the ring gear shaft 126 is acted on the dynamic collinear line vertically downward at the position R. Tes and Ter in FIG. 2 are two equivalent forces into which the torque Te is divided on the basis of the distributive law of the force acting on the rigid body, and there are the following relationships: "Tes=$\rho/(1+\rho)\times$Te" and "Ter=$1/(1+\rho)\times$Te". Considering such a condition that the dynamic collinear line is in balance as the rigid body with the above-described forces acting on, it is possible to obtain torque Tm1 to be acted on the sun gear shaft 125 and torque Tm2 to be acted on the ring gear shaft 126. The torque Tm1 is equal to the torque Tes, and the torque Tm2 is equal to the difference between the torque Tr and the torque Ter.

When the engine 150 connected to the planetary carrier shaft 127 is rotating, the sun gear 121 and the ring gear 122 can rotate in various rotational states under the condition that satisfies the above-described condition about the dynamic collinear line. When the sun gear 121 is rotating, its rotating power can be used for power generation by the motor generator MG1. When the ring gear 122 is rotating, power outputted from the engine 150 can be transmitted to the drive shaft 112. In the hybrid vehicle having the construction as shown in FIG. 1, the power outputted from the engine 150 is distributed into power mechanically transmitted to the drive shaft 112 and power regenerated as electric power. By using the regenerated electric power to perform powering with respect to the motor generator MG2 and assist the power, the hybrid vehicle can drive while outputting predetermined power. Such an operating condition can be taken when the hybrid vehicle normally drives. Incidentally, when a load is high, such as full acceleration, electric power is supplied to the motor generator MG2 even from the battery 194, increasing the power transmitted to the drive shaft 112.

In the above-described hybrid vehicle, it is possible to output the power of the motor generator MG1 or MG2 from the drive shaft 112, so that the hybrid vehicle can drive by using only the power outputted from these motors. Therefore, even if the vehicle is driving, the engine 150 may be stopped or in so-called idle operation. This operating condition can be taken when the vehicle starts moving or drives at low speed. Moreover, in the hybrid vehicle in the embodiment, the power outputted from the engine 150 is not distributed to two paths but can be transmitted only to the side of the drive shaft 112. This is an operating condition which can be taken when the vehicle is driving steadily at high speed and in which the motor generator MG2 is driven around by inertia due to the high-speed driving, causing the vehicle to drive by using only the power outputted from the engine 150 without assistance by the motor generator MG2.

Figure 3:
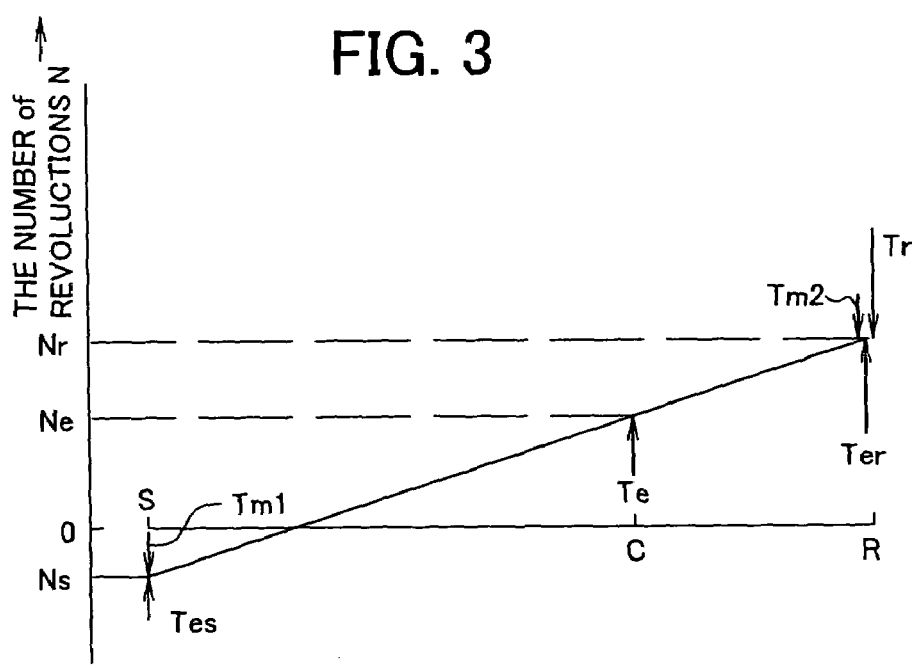
FIG. 3 is a nomogram in the case where the hybrid vehicle in the embodiment is steadily driving at high speed.

FIG. 3 is a nomogram when the vehicle is steadily driving at high speed. In the nomogram shown in FIG. 2, the number of revolutions Ns (i.e., the rotational or revolution speed Ns) of the sun gear shaft is positive, but it is negative as in the nomogram shown in FIG. 3 due to the number of revolutions Ne (i.e., the rotational or revolution speed Ne) of the engine 150 and the number of revolutions Nr (i.e., the rotational or revolution speed Nr) of the ring gear shaft 126. At this time, the rotation direction and the direction in which the torque is acted on become the same in the motor generator MG1, so that the motor generator MG1 is operated as a motor and consumes electrical energy represented as a product of the torque Tm1 and the number of revolutions Ns (which is in the condition of back or inverse powering). In the meantime, the rotational direction and the direction in which the torque is acted on are reversed in the motor generator MG2, so that the motor generator MG2 is operated as a generator and regenerates electrical energy represented as a product of the torque Tm2 and the number of revolutions Nr from the ring gear shaft 126.

As described above, the hybrid vehicle in the embodiment can drive in various operating conditions on the basis of the action of the planetary gear 120.

Next, control operation by the control unit 190 will be explained with reference to FIG. 1 again.

The entire operation of the power output apparatus in the embodiment is controlled by the control unit 190. The control unit 190 is, as is the EFIECU 170, a one-chip microcomputer having therein a CPU, a ROM, a RAM, or the like. The control unit 190 is connected to the EFIECU 170, and the both can transmit various information to each other. The control unit 190 is constructed such that it can indirectly control the operation of the engine 150 by transmitting to the EFIECU 170 information about torque command values, command values of the number of revolutions, or the like, which are required for the control of the engine 150. In this manner, the control unit 190 controls the operation of the power output apparatus as a whole. In order to realize such control, the control unit 190 is provided with various sensors, for example, a sensor 144 for learning the number of revolutions (i.e., the rotational or revolution speed) of the drive shaft 112 or the like. Since the ring gear shaft 126 and the drive shaft 112 are mechanically connected, the sensor 144 for learning the number of revolutions of the drive shaft 112 is provided for the ring gear shaft 126 and is in common with a sensor for controlling the rotation of the motor generator MG 2 in the embodiment.

(Electric Circuit in Power System of Hybrid Vehicle)

Next, an electric circuit provided for the power system of the hybrid vehicle in the embodiment will be explained in more detail with reference to FIG. 4. Namely, the control unit 190, the motor generators MG1 and MG2, the drive circuits 191 and 192, and the battery 194 as shown in FIG. 1 will be described in detail.

Figure 4:
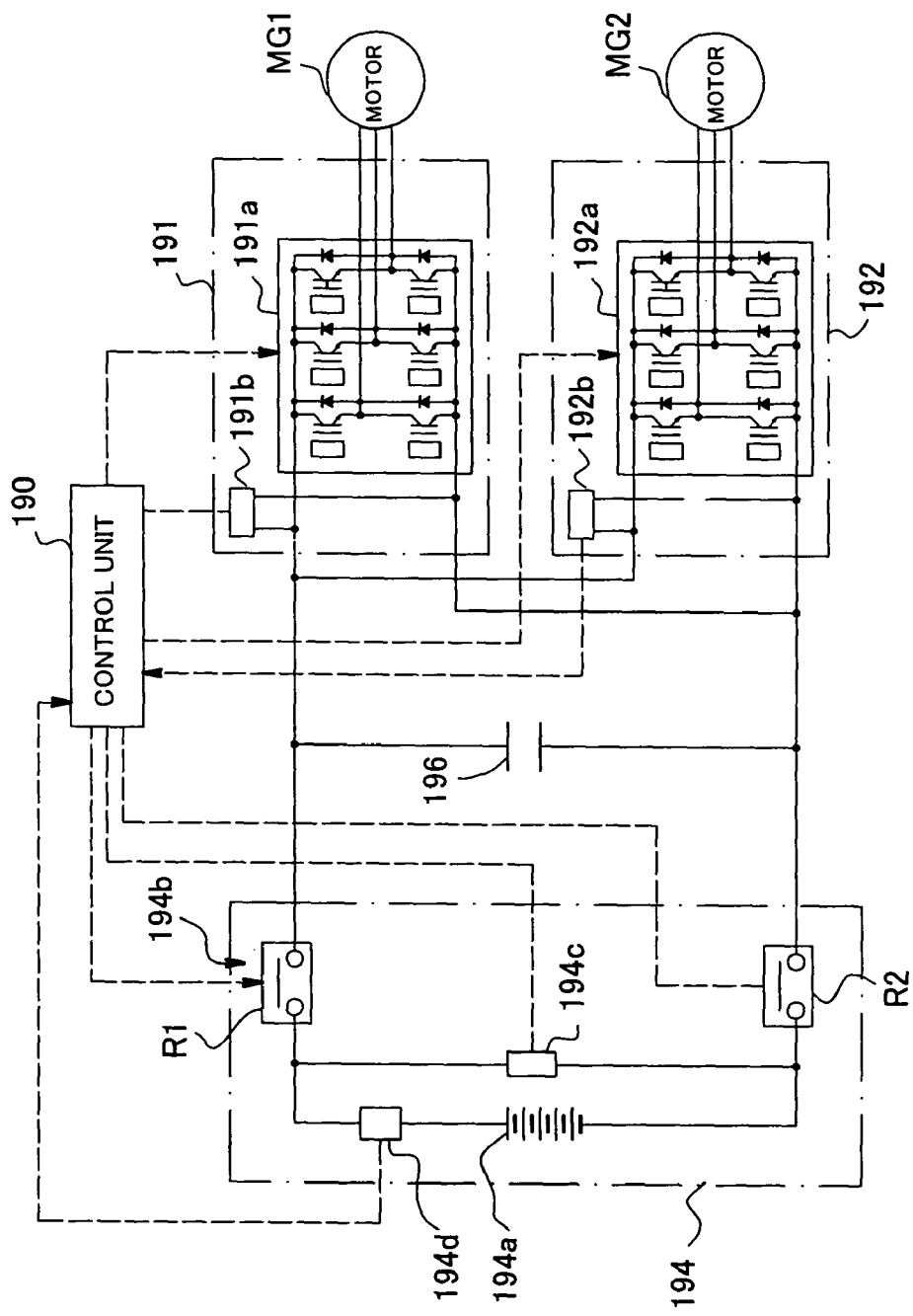
FIG. 4 is a circuit diagram showing the construction of a battery and a motor drive circuit of the hybrid vehicle in the embodiment.

As shown in FIG. 4, an inverter condenser 196; the drive circuit 191, which is connected to the motor generator MG1; and the drive circuit 192, which is connected to the motor generator MG2, are connected in parallel with the battery 194.

Specifically, the battery 194 is provided with: a battery module 194a; a SMR (System Main Relay) 194b; a voltage detection circuit 194c; a current sensor 194d; or the like. The SMR 194b connects and cuts off the power of a high voltage circuit by a command from the control unit 190 and is provided with two relays R1 and R2 placed at the both plus and minus electrodes of the battery module 194a. The reason why the two relays R1 and R2 are provided for the battery 194 is to perform reliable actions by switching on the relay R2 and then the relay R1 when connecting the power and by switching off the relay R1 and then the relay R2 when cutting off the power. The voltage detection circuit 194c detects the total voltage value of the battery module 194a. The current sensor 194d detects an output current value from the battery module 194a. The output signals of the voltage detection circuit 194c and the current sensor 194d are transmitted to the control unit 190.

The drive circuits 191 and 192 are power converters for converting high voltage direct current of the battery and alternating current for the motor generators MG1 and MG2. More specifically, they are respectively provided with three-phase bridge circuits 191a and 192a, each constructed of six power transistors, and by using the three-phase bridge circuits 191a and 192a, they convert the direct current and the three-phase alternating current.

The drive circuits 191 and 192 are provided with voltage detection circuits 191b and 192b, respectively. The voltage detection circuits 191b and 192b detect the back electromotive voltages of the motor generator MG1 and MG2, respectively. The driving of each power transistor of the three-phase bridge circuits 191a and 192a is controlled by the control unit 190. Information necessary for current control, such as voltage values detected at the voltage detection circuits 191b and 192b and current values detected at a not-illustrated current sensor placed between the three-phase bridge circuits 191a and 192a and the motor generators MG1 and MG2, is transmitted from the drive circuits 191 and 192 to the control unit 190.

(Direct Injection Gasoline Engine)

Next, the direction injection gasoline engine, which is provided for the hybrid vehicle in the embodiment, will be explained in more detail with respect to FIG. 5. Namely, the engine 150 shown in FIG. 1 will be described in detail.

Figure 5:
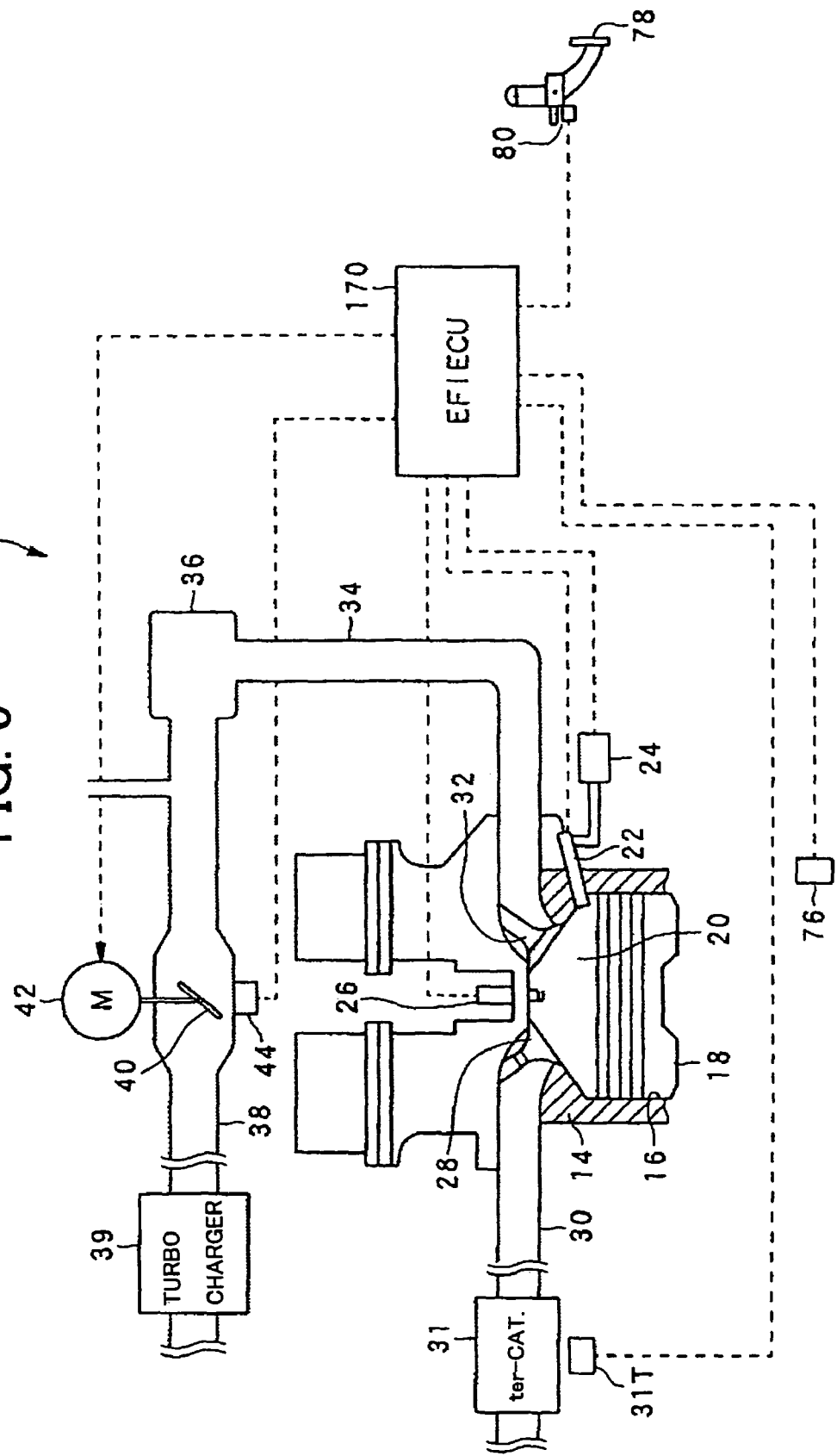
FIG. 5 is a schematic block diagram of the structure of an engine in the embodiment.

As shown in FIG. 5, the engine 150 is a so-called direct injection gasoline engine, which directly injects fuel into a combustion chamber. The engine 150 is controlled by the EFIECU 170. The engine 150 is provided with a cylinder block 14. A cylinder 16 is formed within the cylinder block 14. Incidentally, the engine 150 is provided with a plurality of cylinders, but one cylinder 16 out of the plurality of cylinders is shown for explanatory convenience.

A piston 18 is placed within the cylinder 16. The piston 18 can slide in the vertical direction of FIG. 5 inside the cylinder 16. A combustion chamber 20 is formed in the upper part of the piston 18 within the cylinder 16. An injection nozzle of a fuel injection valve 22 is exposed to the combustion chamber 20. During the operation of the engine 150, fuel is pumped under pressure from a fuel pump 24 to the fuel injection valve 22. The fuel injection valve 22 and the fuel pump 24 are connected to the EFIECU 170. The fuel pump 24 pumps the fuel under pressure to the fuel injection valve 22 side in response to a control signal supplied from the EFIECU 170. The fuel injection valve 22 injects the fuel into the combustion chamber 20 in response to a control signal supplied from the EFIECU 170.

Moreover, the tip of a spark plug 26 is exposed to the combustion chamber 20. The spark plug 26 receives an ignition signal supplied from the EFIECU 170 and ignites the fuel in the combustion chamber 20. An exhaust tube 30 is coupled with the combustion chamber 20 through an exhaust valve 28. Each of the branch pipes of an intake manifold 34 is coupled with the combustion chamber 20 through an intake valve 32. The intake manifold 34 is coupled with a surge tank 36 on its upstream side. On the upstream side of the surge tank 36, an intake tube 38 is further connected.

A throttle valve 40 is positioned and set in the intake tube 38. The throttle valve 40 is coupled with a throttle motor 42. The throttle motor 42 is connected to the EFIECU 170. The throttle motor 42 changes an amount of the throttle valve 40 opening, depending on the control signal supplied from the EFIECU 170. A throttle opening sensor 44 is positioned and set in the vicinity of the throttle valve 40. The throttle opening sensor 44 outputs to the EFIECU 170 an electric signal according to the amount of the throttle valve 40 opening (which is hereinafter referred to as throttle opening SC as occasion demands). The EFIECU 170 detects the throttle opening SC on the basis of the output signal of the throttle opening sensor 44.

An ignition switch 76 (hereinafter referred to as the IG switch 76) is connected to the EFIECU 170. The EFIECU 170 detects the on/off state of the IG switch 76 on the basis of the output signal of the IG switch 76. When the IG switch 76 is set from on to off, the fuel injection by the fuel injection valve 22, the fuel ignition by the spark plug 26, and the fuel pumping by the fuel pump 24 are stopped, and the operation of the engine 150 is stopped.

An accelerator opening sensor 80 is positioned and set in the vicinity of a gas pedal 78. The accelerator opening sensor 80 outputs to the EFIECU 170 an electric signal according to an amount of the gas pedal 78 pressing (which is hereinafter referred to as accelerator opening AC). The EFIECU 170 detects the accelerator opening AC on the basis of the output signal of the accelerator opening sensor 80.

In this embodiment, a turbo charger 39 is provided for the intake tube 38 and is constructed to turbo-charge compressed air into the intake tube 38, for example, by using a turbine that works with a turbine provided on the exhaust tube 30 side. The turbo charger 39 has a rotating shaft driven by an exclusive motor generator, which is different from the motor generators MG1 and MG2, and is constructed such that the increase of the number of revolutions increases supercharged pressure by the turbo-charging. Namely, it is constructed such that "turbo assist" is executable. Incidentally, the exclusive motor generator is constructed to regenerate the exhaust energy of the engine 150 on the exhaust tube 30 side by power generation. Moreover, the turbo charger 39 may be constructed to variably increase cylinder pressure at the particular timing by receiving the control by the EFIECU 170.

In the embodiment, the exhaust tube 30 is provided with a ternary catalytic apparatus 31, and this increases performance of exhaust gas purification. Incidentally, the purification performance of the ternary catalytic apparatus 31 is markedly reduced at a lower temperature than a certain temperature. Thus, the ternary catalytic apparatus 31 mounts thereon a temperature sensor 31T, by which the catalytic temperature TCA is detected, and this temperature is inputted to the EFIECU 170 as catalytic temperature information. Alternatively, such a catalytic temperature TCA may be indirectly estimated on the basis of other detection information, such as engine revolutions of the engine 150. The catalytic temperature TCA detected or estimated in the above manner is used for engine-control not to decrease the catalytic temperature below the certain temperature.

(First Embodiment—Air/fuel Ratio Control to Prevent Catalyst Deterioration)

Figure 6:
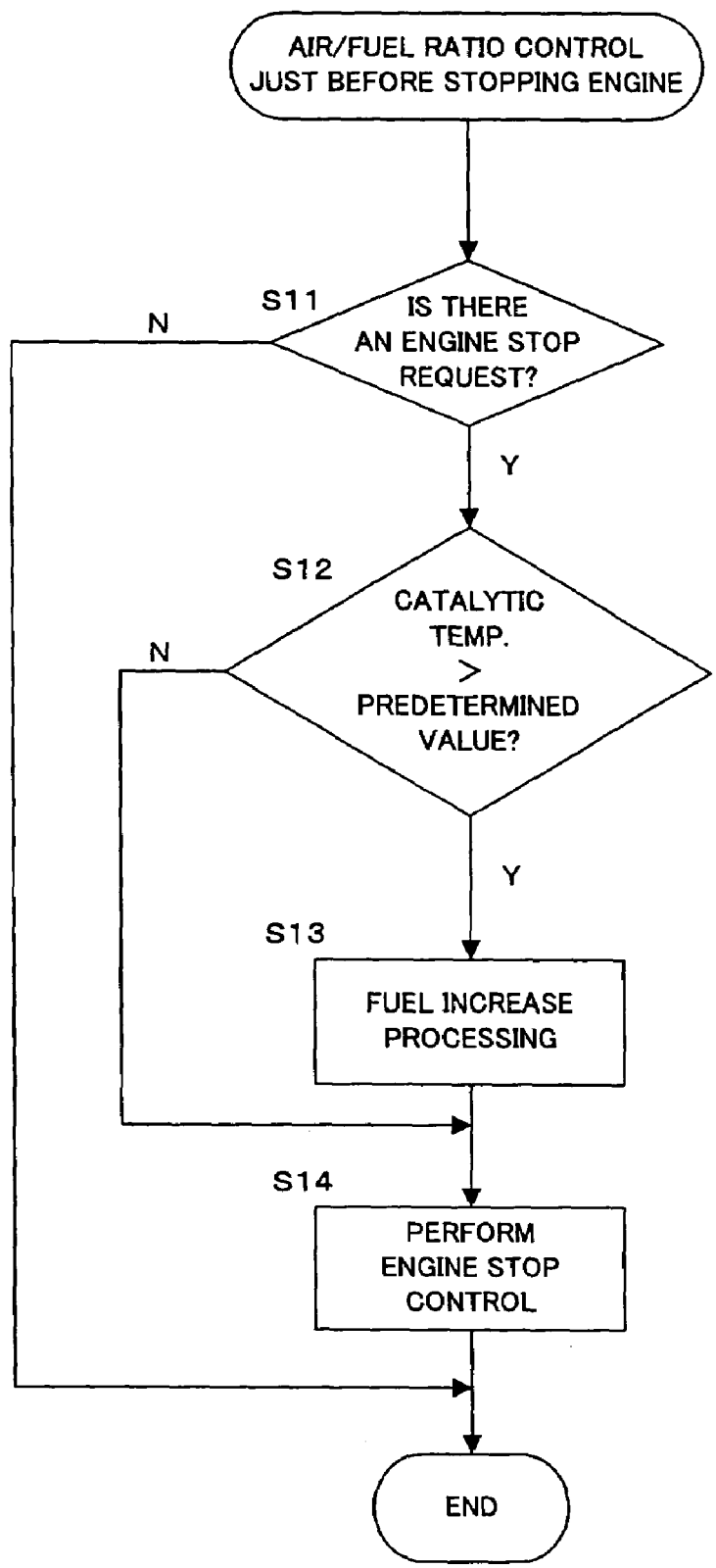
FIG. 6 is a flow chart showing operational flows to prevent the deterioration of a catalyst by performing air/fuel ratio control for making an air/fuel mixture fuel-rich when the engine is stopped, in a first embodiment.
Figure 7:
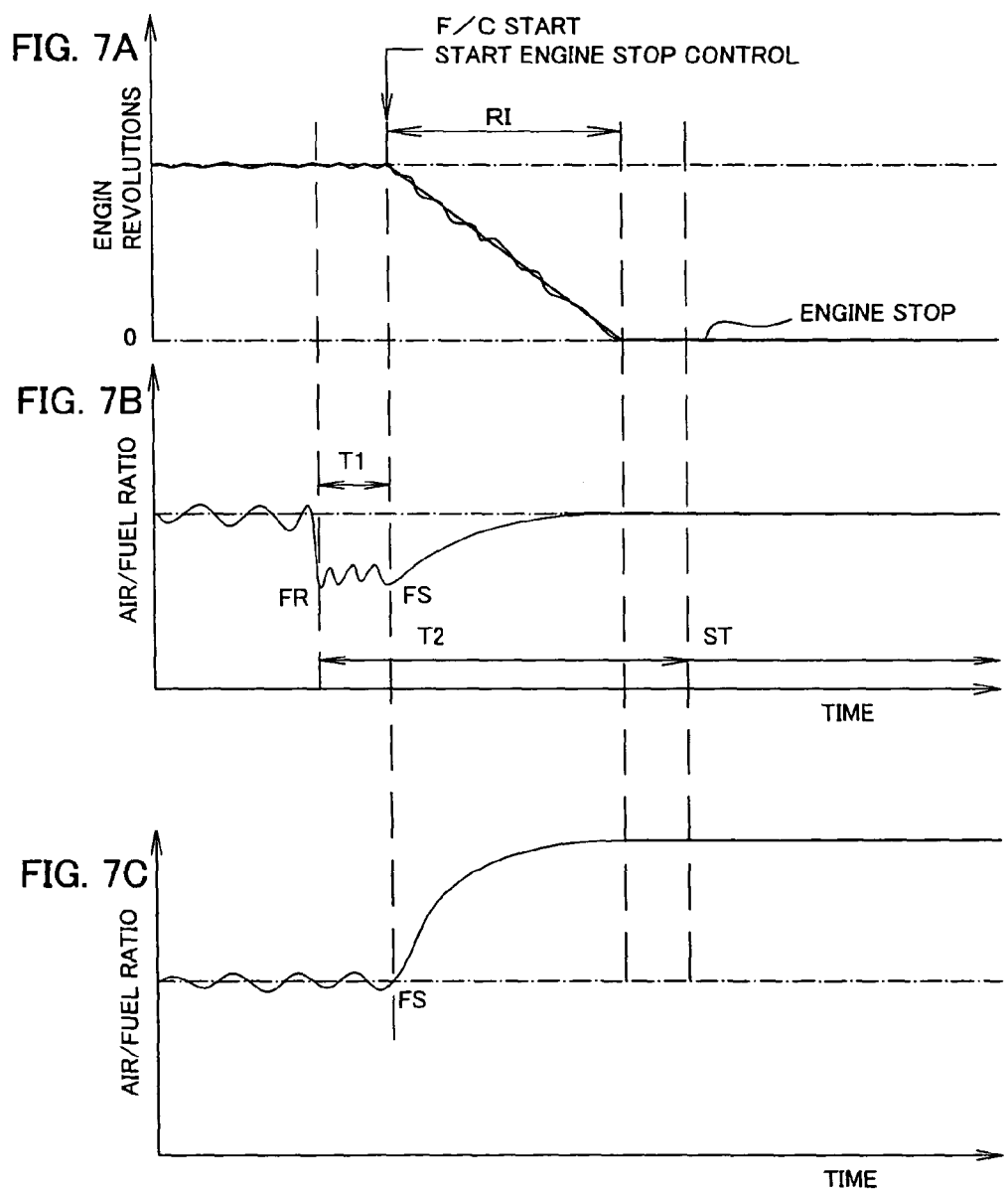

Hereinafter, a method of effectively preventing the deterioration of a catalyst in the ternary catalytic apparatus 30 by using the control unit 190 and the EFIECU 170, which constitute "the control device" associated with the present invention, will be explained with reference to FIG. 6 and FIGS. 7A to 7C. FIG. 6 is a flow chart showing operational flows to prevent the deterioration of a catalyst by performing air/fuel ratio control for making an air/fuel mixture fuel-rich when the engine is stopped. FIG. 7A to FIG. 7C are graphs showing how engine revolutions and the air/fuel ratio change by the proceeding steps shown in FIG. 6, in which FIG. 7A shows the change in the engine revolutions with the passage of time, FIG. 7B shows the change in the air/fuel ratio depending on the passage of time, and FIG. 7C shows the change in the air/fuel ratio as a comparison example to FIG. 7B.

In FIG. 6, it is firstly judged whether or not there is an engine stop request, namely, whether or not the engine 150 is stopping at the present moment (step S11). If it is judged that there is the engine stop request in this step S11 (Yes), the operational flow moves forward to new processing to realize the air/fuel control for making fuel rich (from the step S11 to a step S12), and if not, the air/fuel control ends (from the step S11 to a step END).

Here, the case where the former processing is chosen, i.e. the case where it is judged that "there is" the stop request, can be typically considered to be time when facing a transition time point from an operating period to a down period in the intermittent operation of the engine 150 at the hybrid power output apparatus shown in FIG. 1, for example. This is because it is not necessary to always operate the engine 150, as explained with reference to FIG. 2 and FIG. 3, since in the hybrid power output apparatus (refer to FIG. 1) associated with the present invention, the cooperation of the engine 150 and the motor generators MG1 and MG2 enables a vehicle to be driven. Here, the case where the engine 150 may be idling is determined specifically, for example, on the basis of the degree of the accelerator opening AC, the charge state of the battery 194, or the like. Moreover, an operating condition that the engine 150 is actually idling can be taken when the vehicle starts moving or drives at low speed.

Next, it is judged whether or not the catalytic temperature in the ternary catalytic apparatus 31 is above a predetermined temperature threshold value set in advance (step S12). If it is judged that the catalytic temperature is above the predetermined value in this step S12 (Yes), the operational flow moves forward to new processing to realize the air/fuel control for making fuel rich (from the step S12 to a step S13), and if not, it moves to the engine stop control processing as described below (from the step S12 to a step S14).

Such processing can be performed by using measurement results brought by the temperature sensor 31T shown in FIG. 5.

Incidentally, in the above processing, the present temperature of the ternary catalytic apparatus 31 is confirmed on the basis of direct measurement results with the temperature sensor 31T, but the present invention is not limited to this mode. Namely, in order to confirm the present temperature of the ternary catalytic apparatus 31, the confirmation of other parameters closely related to the temperature makes it possible to estimate the temperature from the parameters. Specifically, the temperature of the ternary catalytic apparatus 31 has a certain functional relationship with the cooling water temperature, intake air amount, engine revolutions, or the like of the engine 150. Therefore, the present temperature of the ternary catalytic apparatus 31 can be estimated by using the above-exemplified various values.

As described above, when there is the engine stop request (the step S11: Yes), and when the catalytic temperature is above the predetermined temperature threshold value (the step S12: Yes), fuel increase processing of increasing the amount of fuel in the combustion chamber 20 from the present amount is subsequently performed (step S13). Specifically, the fuel is pumped under pressure from the fuel pump 24 to the fuel injection valve 22, and the fuel injection valve 22 injects the fuel into the combustion chamber 20 in response to the control of the EFIECU 170.

In the first embodiment, after this fuel increase processing is performed, the stop processing of stopping the engine 150 is actually performed (step S14) in response to the engine stop request in the step S11.

According to such fuel increase processing or engine stop processing which is performed after the former processing, changes in the engine revolutions and the air/fuel ratio are as shown in FIGS. 7A to 7B. Firstly, FIG. 7B shows that the air/fuel ratio decreases after a time point shown with a reference numeral FR, which is caused by the increase of the fuel amount from the present amount at the time point FR. In other words, the ratio of fuel to air increases (i.e. it becomes "fuel-rich"). This fuel increase processing continues for a predetermined period T1 from the above-described time point FR, and then ends at a time point after passing the period T1 (refer to a reference numeral FS in FIG. 7B). Namely, the supply of fuel is stopped at the time point FS.

Incidentally, an atmosphere of the catalyst maintains the fuel-rich condition for the predetermined period T1 or longer (refer to a reference numeral T2 in FIG. 7B) by such fuel increase processing. Then this condition is over soon, and the air/fuel. ratio of the atmosphere of the catalyst returns to be ideal (refer to a reference numeral ST in FIG. 7B). As for the period T1 in which the fuel increase processing is performed, it can be set variously in view of the effects of many parameters or the like, but specifically, for example, it may be preferably about two to three seconds.

On the other hand, after such fuel increase processing is performed, the engine stop processing is performed as shown in FIG. 7A. Especially in the first embodiment, this engine stop processing and the above-described fuel supply stop processing are performed at the same time, i.e. at the time point FS. When the engine 150 is actually stopped, the engine 150 runs idle, so that air is compulsively emitted from the combustion chamber 20 to the exhaust tube 30. In the first embodiment, since the fuel increase processing is performed before that (i.e. before the time point FS), the inside of the combustion chamber 20 is in the fuel-rich condition, so that fuel-rich gases are emitted from the combustion chamber 20 to the exhaust tube 30.

According to this, the catalyst constituting the ternary catalytic apparatus 31 is not exposed to the lean atmosphere in the first embodiment. Moreover, this is valid even when the engine 150 runs idle as described above (refer to a reference numeral RI in FIG. 7A). Namely, even if air is fed into the exhaust tube 30 by this idle running, a risk of exposing the catalyst to the lean atmosphere decreases. In fact, FIG. 7B shows that the air/fuel ratio gradually increases in the period T2, as compared with the air/fuel ratio at the time point FS, which is caused by air that fed is into the exhaust tube 30 by the idle running of the engine 150. The fuel-rich condition is still held even in the period T2, so that it is understandable that the catalyst is not exposed to the lean atmosphere.

In this regard, the catalyst is exposed to the lean atmosphere in a comparison example (refer to FIG. 7C) in which the fuel supply stop processing is merely performed at the same time of the engine stop processing. Namely, in this FIG. 7C, the fuel increase processing is not performed before the time point FS and only the fuel supply stop is performed at the time point FS, and thus, the inside of the exhaust tube 30 becomes the lean atmosphere due to air that is fed into by the idle running of the engine 150 after the time point FS. Under such circumstances, the catalyst deterioration of the ternary catalytic apparatus 31 results in accelerating.

As described above, according to the first embodiment, it is possible to efficiently prevent the catalyst deterioration in the ternary catalytic apparatus 31.

Moreover, in the first embodiment, the above-described air/fuel ratio control is performed at each transition time point from an operating period to a down period in the intermittent operation of the engine. In this case, this transition time point from an operating period to a down period, or the reverse transition, is generally repeated many times, in the operating period of the hybrid power output apparatus as a whole. In spite of many transition time points to go through, if no measures are taken, as shown in FIG. 7C, the catalyst deterioration could accelerate more. However, in the first embodiment, since the above-described air/fuel ratio control for making fuel-rich is basically performed at each transition time point from an operating period to a down period, as described above, even if the transition time point comes many times, that does not accelerate the catalyst deterioration by just that much.

Moreover, in the first embodiment, since the air/fuel ratio control as described above is performed depending on the catalytic temperature of the ternary catalytic apparatus 31, and more specifically, it is performed only if the catalytic temperature is above the predetermined value (refer to the step S12 in FIG. 6), so that it is possible to efficiently inhibit the progress of the catalyst deterioration. Looking at this from the opposite viewpoint, in the case where the catalyst is at a relatively low temperature, which means that the above-described air/fuel ratio control is not performed, i.e. the fuel increase processing accompanied with this is not performed, it is possible to save the fuel required for the processing by just that much. Furthermore, if any measure is taken which reduces opportunities to perform the air/fuel ratio control as much as possible, as described above, it is possible to prevent, as much as possible, the occurrence of such a situation that influences the movement of a vehicle on which the hybrid power output apparatus is mounted, or the like.

Incidentally, in the above-described first embodiment, the air/fuel ratio control for making fuel-rich is performed only if the catalytic temperature is above the predetermined temperature threshold value (refer to the step S12 in FIG. 6), but the present invention is not limited to this mode. Namely, in some cases, such a mode may be taken that the processing in the step S12 in FIG. 6 is omitted and the above-described air/fuel ratio control is always performed if it is judged that there is the engine stop request. In this case, it is not possible to obtain the effect of an action obtained by the above-described air/fuel ratio control according to the catalytic temperature, but it is possible to obtain the effect of an action associated with the prevention of the catalyst deterioration.

(Second Embodiment—Control of Fuel Cut Time Point to Prevent Catalyst Deterioration)

Figure 8:
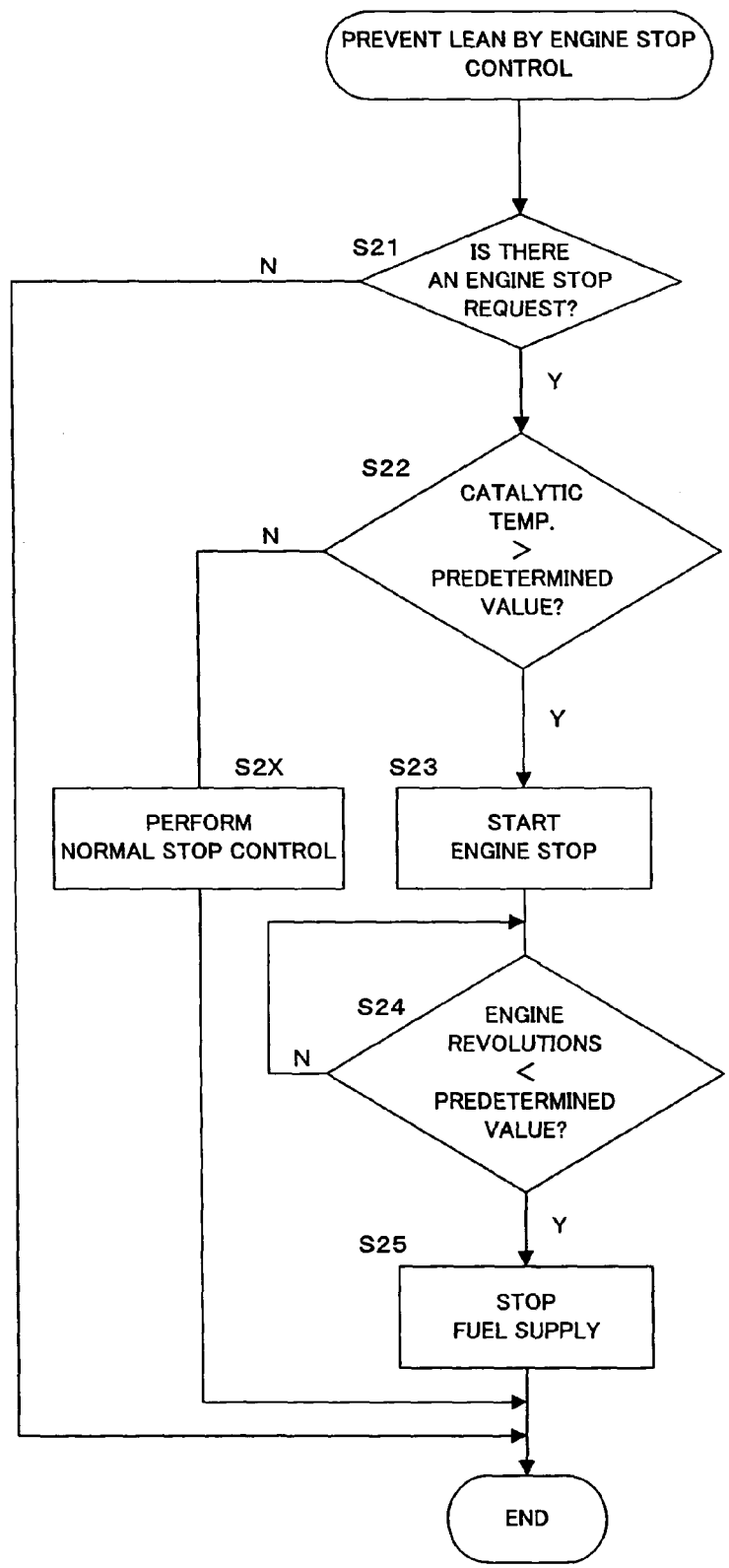
FIG. 8 is a flow chart showing operational flows to prevent the deterioration of a catalyst by preferably setting the execution period of fuel supply stop processing depending on the engine revolutions or the like when the engine is stopped, in a second embodiment of the present invention.
Figure 9:
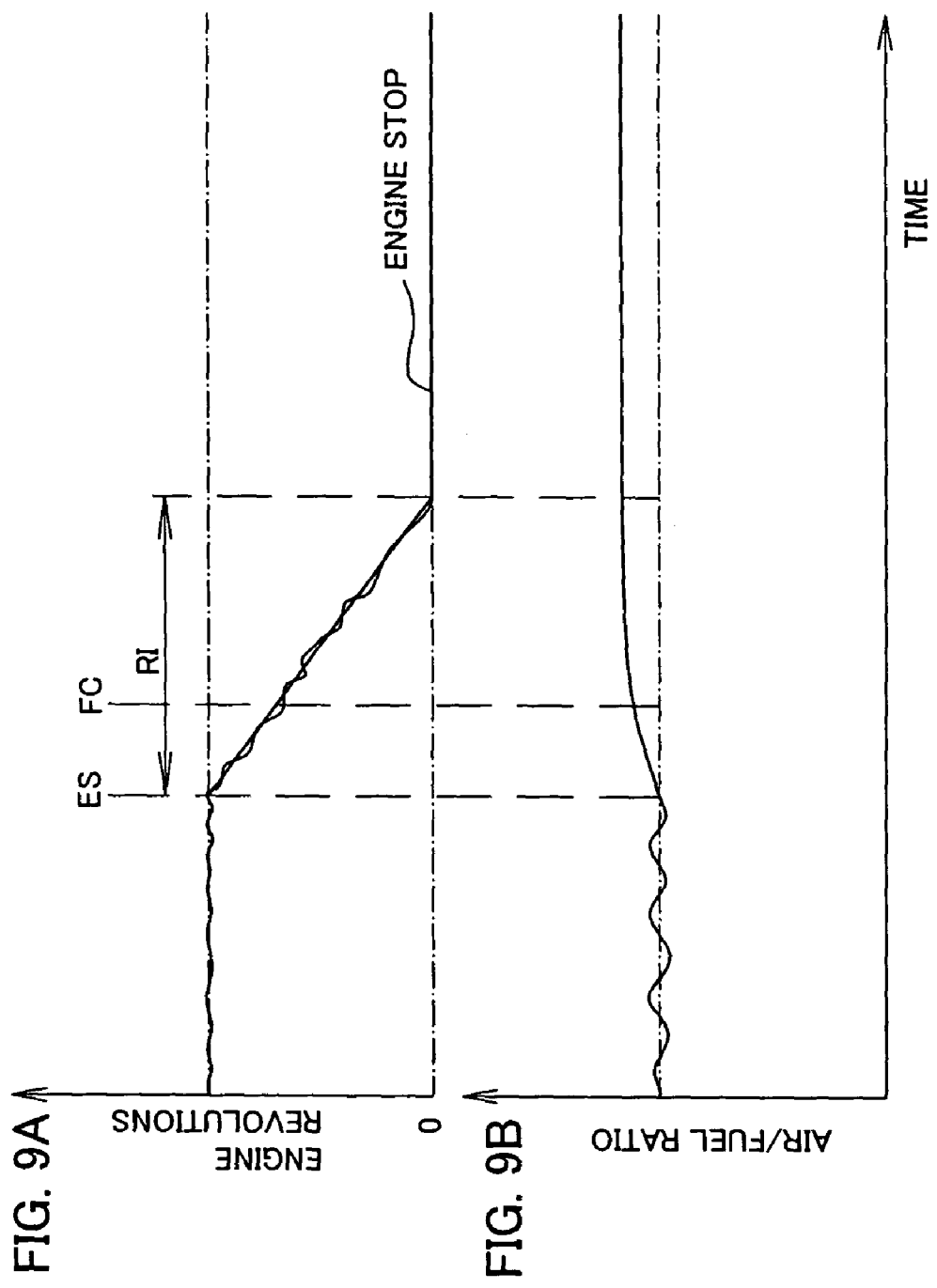

Hereinafter, a method of effectively preventing the deterioration of a catalyst in the ternary catalytic apparatus 30 by using the control unit 190 and the EFIECU 170, which constitute "the control device" associated with the present invention, will be explained with reference to FIG. 8 and FIGS. 9A and 9B. FIG. 8 is a flow chart showing operational flows to prevent the deterioration of a catalyst by preferably setting the execution period of fuel supply stop processing depending on the engine revolutions or the like when the engine is stopped. FIG. 9A and FIG. 9B are graphs showing how the engine revolutions and the air/fuel ratio change by the proceeding steps shown in FIG. 8, in which FIG. 9A shows the change in the engine revolutions with the passage of time, and FIG. 9B shows the change in the air/fuel ratio depending on the passage of time.

In FIG. 8, it is firstly judged whether or not there is an engine stop request, namely, whether or not the engine 150 is stopping at the present moment (step S21). If it is judged that there is the engine stop request in this step S21 (Yes), the operational flow moves forward to new processing to realize the fuel supply stop processing or the like (from the step S21 to a step S22), and if not, this control ends (from the step S21 to a step END).

Here, the case where the former processing is chosen, i.e. the case where it is judged that "there is" the stop request, is the same as that explained with reference to the above-described step S11 in FIG. 6.

Next, it is judged whether or not the catalytic temperature in the ternary catalytic apparatus 31 is above a predetermined temperature threshold value set in advance (step S22). If it is judged that the catalytic temperature is above the predetermined value in this step S22 (Yes), the operational flow moves forward to new processing to realize the fuel supply stop processing or the like (from the step S22 to a step S23), and if not, it moves to normal engine stop control processing (from the step S22 to step S2X). The "normal" engine stop processing means the case where the fuel supply stop processing and the engine stop processing are performed at the same time. According to the execution of such normal engine stop processing, it is possible to avoid such a situation beforehand that the supply of fuel into the combustion chamber 20 in spite of the lowering of the engine revolutions causes the transition delay of the engine stop and thus influences the movement of a vehicle on which the hybrid power output apparatus is mounted, or the like.

Incidentally, as described above, a method of actually realizing the confirmation processing of the catalytic temperature (e.g. a method of using the temperature sensor 31T or the like), the significance of the processing, or the effect of its action are the same as those described above.

As described above, when there is the engine stop request (the step S21: Yes), and when the catalytic temperature is above the predetermined temperature threshold value (the step S22: Yes), the engine stop processing is subsequently performed (step S23). More specifically, the motor generator MG2 in addition to or in place of the motor generator MG1 are regenerated under the control of the control unit 190 in FIG. 1. This lowers the engine revolutions, thereby stopping the movement or the like of the piston 18 constituting the engine 150.

Then in the second embodiment, after this engine stop processing is started, the engine revolutions of the engine 150 are monitored (step S24) by using the sensor 144. Since the engine 150 has already received the stop processing, the engine revolutions of the engine 150 will gradually decrease with the passage of time. If the engine revolutions are equal to or more than a predetermined value, the monitoring is continued (the step S24 is circulated), and if the engine revolutions are lower than the predetermined value (step S24: Yes), the operational flow moves to the fuel supply stop processing (from the step S24 to a step S25).

According to such fuel supply stop processing or the like, changes in the engine revolutions and the air/fuel ratio are as shown in FIGS. 9A and 9B. Firstly, FIG. 9A shows that the engine revolutions of the engine 150 decrease after a time point shown with a reference numeral ES, which is caused by that the stop processing of stopping the engine 150 is put in action at the time point ES. On the other hand, after such stop processing of stopping the engine 150 is performed, the fuel supply stop processing is performed at the time point FC at which the engine revolutions of the engine 150 are lower than the predetermined value.

According to this, the fuel supply continues for a short time (between the time point ES and the time point FC in FIG. 9A) even after the engine is stopped, so that it is possible to inhibit the increase of the air/fuel ratio, as compared with the case where at least the engine stop processing and the fuel supply stop processing are performed at the same time (refer to FIG. 7C). In other words, as compared with such a case, it is possible to make an atmosphere in the combustion chamber 20 fuel-rich, and thereby making gas emitted from the combustion chamber 20 fuel-rich.

As described above, by virtue of the second embodiment, it is possible to reduce such a risk that the catalyst constituting the ternary catalytic apparatus 31 is exposed to the lean atmosphere, and it is possible to reduce the degree of the lean. Moreover, this is valid even when the engine 150 runs idle as described above (refer to a reference numeral RI in FIG. 9A). Namely, even if air is fed into the exhaust tube 30 by this idle running, a risk of exposing the catalyst to the lean atmosphere decreases. In fact, FIG. 9A shows that a relatively fuel-rich atmosphere, as compared with the case in FIG. 7C, is achieved as mentioned before.

Incidentally, in the above explanation, the processing steps shown in FIG. 6 and the processing steps shown in FIG. 8 are separately explained for convenience, but the present invention obviously includes aspects having these modes. Namely, such an aspect may be taken that performs the fuel increase processing before the engine stop processing as well as performing the fuel supply stop processing after the engine stop processing. According to such an aspect, an atmosphere around the catalyst becomes more fuel-rich, so that it is possible to inhibit the progress of the catalyst deterioration.

(Third Embodiment—Air/fuel Ratio Control by Air Amount Adjustment Device to Prevent Catalyst Deterioration)

Hereinafter, the third embodiment, in which the first embodiment is further developed, will be explained with reference to the above-described FIG. 5 and FIG. 1, as occasion demands, in addition to FIG. 10 and FIGS. 11A to 11D. In the third embodiment, the air that is fed into the exhaust tube 30 by the idle running of the engine has a relatively small amount, and moreover, the air that is fed into this exhaust tube 30 stays on the upper stream side than the ternary catalytic apparatus 31, by virtue of a not-illustrated idle speed control (ISC) valve, the intake valve 32, a not-illustrated variable valve timing (VVT) mechanism, the exhaust valve 28, and the motor generator MG1 or the like, which constitute one example of "the air amount control device" associated with the present invention, in addition to the control unit 190 and the EFIECU 170, which constitute "the control device" associated with the present invention, so that it is possible to remarkably reduce a risk of exposing the catalyst in the ternary catalytic apparatus 31 to the lean atmosphere and prevent the catalyst deterioration more effectively.

Figure 10:
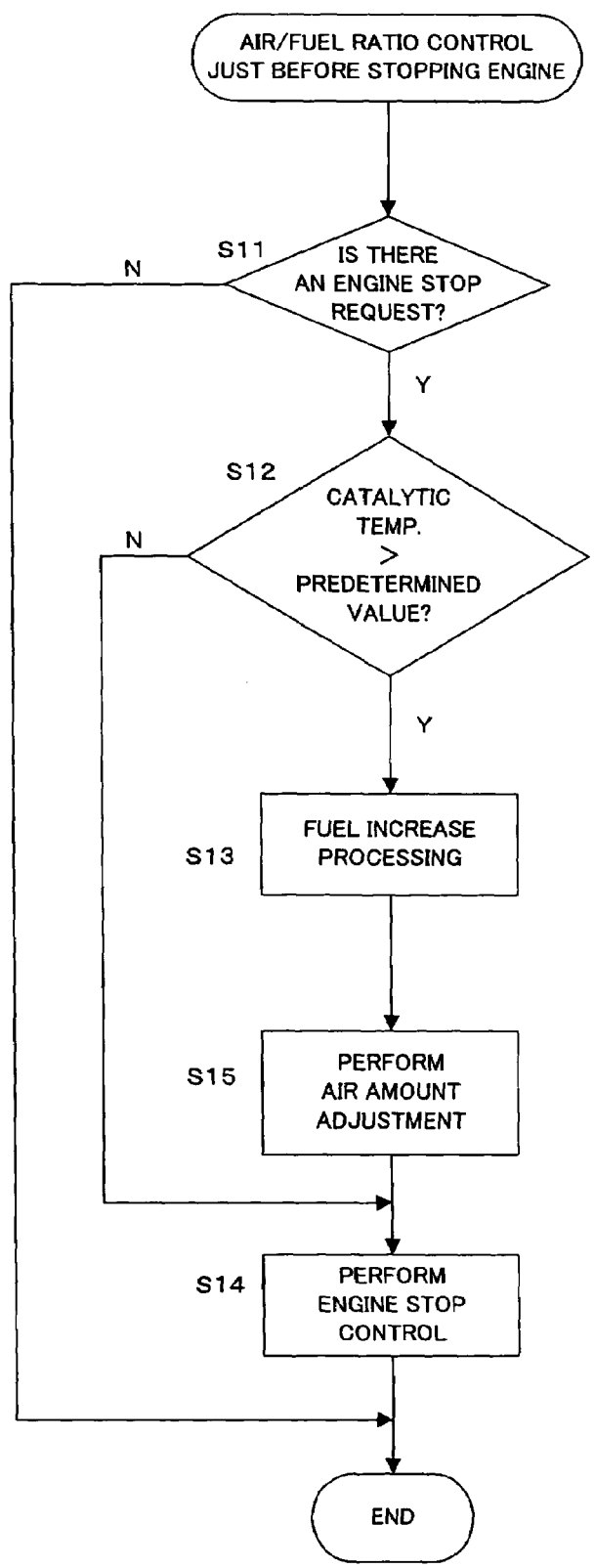
FIG. 10 is a flow chart showing operational flows to prevent the deterioration of a catalyst by performing air/fuel ratio control for making an air/fuel mixture fuel-rich and for adjusting the amount of air when the engine is stopped, in a third embodiment of the present invention.

FIG. 10 is a flow chart showing operational flows to prevent the deterioration of a catalyst more effectively by performing air/fuel ratio control for making an air/fuel mixture fuel-rich and for adjusting the amount of air when the engine is stopped. Incidentally, in FIG. 10, the same steps as those in FIG. 6 carry the same reference numerals and the detailed explanations of them are omitted. FIG. 11A to FIG. 11D are graphs showing how the engine revolutions and the air/fuel ratio change by the proceeding steps shown in FIG. 10, in which FIG. 11A shows the change in the engine revolutions with the passage of time, FIG. 11B shows the change in the air/fuel ratio depending on the passage of time, and FIG. 11C and FIG. 11D show the change in the air/fuel ratio as a comparison example to FIG. 11B.

In FIG. 10, the processing steps from the step S11 to the step S13 are the same as those in the first embodiment in FIG. 6.

In the third embodiment, the adjustment of an air amount is performed by an air amount adjustment device after the fuel increase processing in the step S13 is completed (step S15). Specifically, in an intake system, under the control of the EFIECU 170, the not-illustrated ISC valve for adjusting an air amount in the idle operation, which is placed on a not-illustrate intake passage for bypassing the throttle valve 40 in FIG. 5, is closed and the close timing of the intake valve 32 is delayed, i.e. retarded, by the not-illustrated VVT mechanism. This allows the relatively small air amount supplied into the combustion chamber 20. Moreover, under the control of the control unit 190, the motor generator MG2 in addition to or in place of the motor generator MG1 are regenerated in FIG. 1. This causes the reduction of the engine revolutions. By virtue of these, it is possible to make the relatively small air amount fed into the exhaust tube 39 by the idle running of the engine.

On the other hand, in an exhaust system, under the control of the EFIECU 170, an exhaust system valve, such as a not-illustrated exhaust gas re-circulation (EGR) valve which is placed in the downstream of the exhaust tube 30 in FIG. 5, is closed. This allows the increase of pressure in the exhaust tube 30. Moreover, the opening of a not-illustrate exhaust throttle valve is secured. This enables the re-circulation of air inside of the engine. By virtue of these, it is possible to make the air that is fed into the exhaust tube 30 by the idle running of the engine stay on the upper stream side than the ternary catalytic apparatus 31.

The above-described construction remarkably decreases a risk of exposing the catalyst in the ternary catalytic apparatus 31 to the lean atmosphere.

In the third embodiment, after the fuel increase processing is performed, the air amount adjustment device starts to perform, and the stop processing of stopping the engine 150 is actually performed (the step S14) for the first time in response to the engine stop request in the step S11.

On the other hand, if it is judged that the catalytic temperature is not above the predetermined value in the step S12, the operational flow moves to the above-described engine stop control processing (from the step S12: NO to the step S14). Namely in the third embodiment, the fuel increase processing and the air amount adjustment device are not performed if the catalysis is at a relatively low temperature. Incidentally, even if the above-described series of processing steps or the like associated with the present invention is not performed, that does not mean that the catalyst deterioration is accelerated because in that case the catalyst is at a relatively low temperature. Considering that as the catalyst is at a higher temperature, the deterioration accelerates more, it is possible to perform such control that if the catalytic temperature is above the certain predetermined temperature threshold value, the above-described processing steps or the like are performed, and if not, they are not performed. As described above, according to the third embodiment, it is possible to inhibit the catalyst deterioration more efficiently.

Next, with reference to FIGS. 11A to 11D, changes in the engine revolutions and the air/fuel ration in the third embodiment will be explained, wherein the air amount adjustment device, the engine stop processing, and the fuel supply stop processing is performed after the fuel increase processing is performed. Incidentally, changes in the engine revolutions from the idle operation to the engine stop in FIG. 11A, and the fuel increase processing from the time point shown with the reference numeral FR to the time point after passing the period T1 in FIG. 11B and FIG. 11C (refer to the reference numeral FS in FIG. 11B and FIG. 11C) are the same as those in the first embodiment in FIG. 7B.

As shown in FIG. 11A, especially in the third embodiment, after the fuel increase processing is performed, the air amount adjustment device, the engine stop processing, and the fuel supply stop processing start at the same time, namely, from the time point FS. If the engine 150 is actually stopped at the time point FS, then the engine 150 runs idle after that, so that air is compulsively emitted from the combustion chamber 20 to the exhaust tube 30. In the third embodiment, by virtue of the air amount adjustment device explained in the above-described step S15, it is possible to make the air that is fed into the exhaust tube 39 by this idle running of the engine have a relatively small amount and make the air that is fed into this exhaust tube 30 stay on the upper stream side than the ternary catalytic apparatus 31. Therefore, in the third embodiment, not only by performing the fuel increase processing before the engine stop processing to reduce the air/fuel ratio in advance, as in the first embodiment, but also by adjusting the air amount flowed into the catalyst, it is possible to inhibit, as much as possible, the increase of the air/fuel ratio with the engine idle running.

In fact, FIG. 11B shows that the air/fuel ratio gradually increases in the period T2, as compared with the air/fuel ratio at the time point FS, which is caused by the air that is fed into the exhaust tube 30 in the idle running of the engine 150 (refer to the reference numeral RI). However, in the third embodiment, by adjusting the air amount flowed into the catalyst, it is possible to inhibit the increase of the air/fuel ratio as much as possible. Namely, in the third embodiment, not only in the predetermined period T1 in which the fuel increase processing is performed, but also in the period T2 that includes the idle running of the engine and that is longer than the period T1 it is possible to maintain the air/fuel mixture to be fuel-rich for a short time. Incidentally, this condition is over soon and the air/fuel ratio of the air/fuel mixture returns to be ideal (refer to the reference numeral ST).

The above-described construction remarkably decreases a risk of exposing the catalyst in the ternary catalytic apparatus 31 to the lean atmosphere.

Next, a first comparison example in the third embodiment will be explained with reference to FIG. 11C. In this first comparison example, the air amount adjustment device is not performed after the fuel increase processing is performed, but only the fuel supply stop processing is performed at the same time of the engine stop processing. In FIG. 11C, it is not possible to prevent the catalyst from becoming the lean atmosphere after the time point FT. Namely, in the first comparison example, even if the fuel-rich condition is realized by the fuel increase processing before the time point FS, such a fact alone that the engine stop processing and the fuel supply stop processing start at the time point FS, cannot prevent the inside of the exhaust tube 30 from becoming the lean atmosphere after the time point FS due to the increase of the air/fuel ratio by the air that is fed into the exhaust tube 30 by the idle running of the engine 150.

Incidentally, a second comparison example in FIG. 11D is the same as the comparison example in the first embodiment in FIG. 7C.

As described above, according to the third embodiment, it is possible to prevent the catalyst deterioration in the ternary catalytic apparatus 31 more effectively.

(Fourth Embodiment—Air/fuel Ratio Control by Feedback-Learning to Prevent Catalyst Deterioration)

Hereinafter, the fourth embodiment, in which the first embodiment is developed, will be explained with reference to FIGS. 12A and 12B and FIGS. 13A to 13D. In the fourth embodiment, accurate air/fuel ratio control is realized when the engine is stopped, by increasing, decreasing, or correcting an fuel increasing value in the fuel increase processing just before the engine stop by virtue of feedback-learning, in which the experimental values of the air/fuel ratio, which becomes constant at the previous or past stop time of the engine, are used as input information, by using a not-illustrated O2 (Oxygen) sensor, which constitutes one example of "the oxygen concentration sensor" associated with the present invention, and a backup RAM or the like of the EFIECU 170, which constitutes one example of "the air/fuel ratio memory device" associated with the present invention, in addition to the EFIECU 170, which constitutes "the control device" associated with the present invention, so that it is possible to remarkably reduce a risk of exposing the catalyst to the lean atmosphere and prevent the catalyst deterioration more effectively.

Figure 12A:
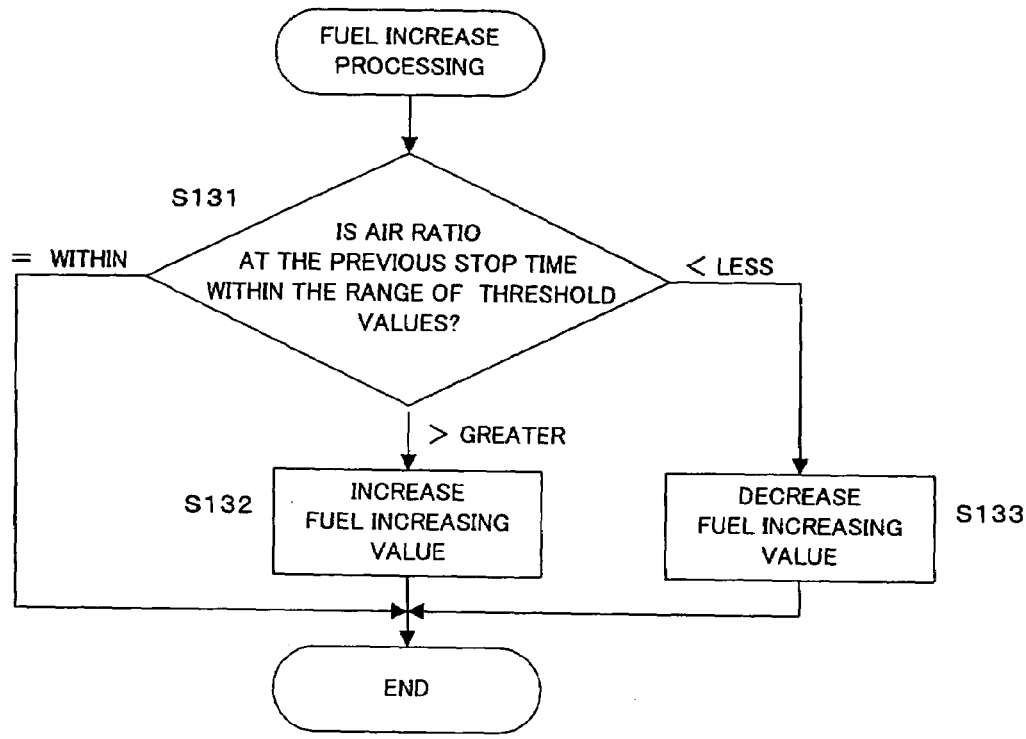
FIG. 12A and FIG. 12B are flow charts showing operational flows to increase, decrease, or correct a fuel increasing value in fuel increase processing by feedback-learning, in a fourth embodiment of the present invention.
Figure 12B:
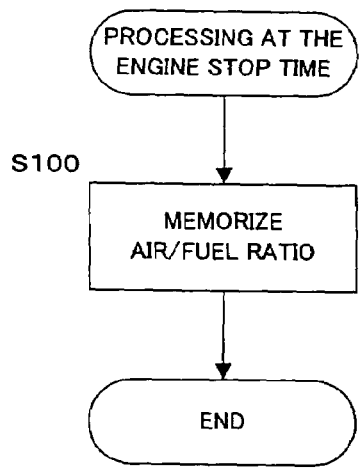
Figure 13A:
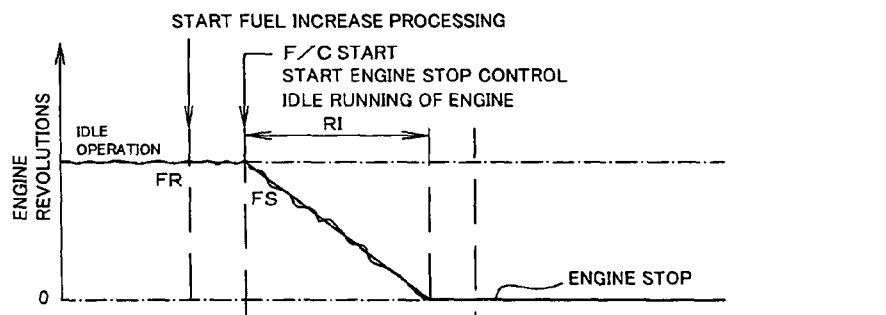
Figure 13B:
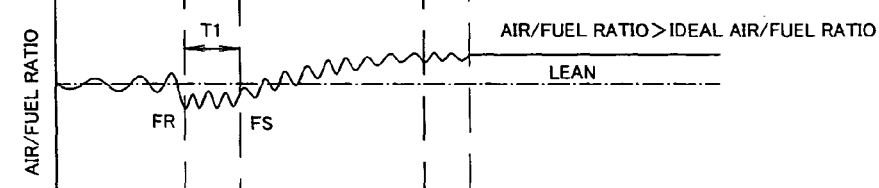
Figure 13C:
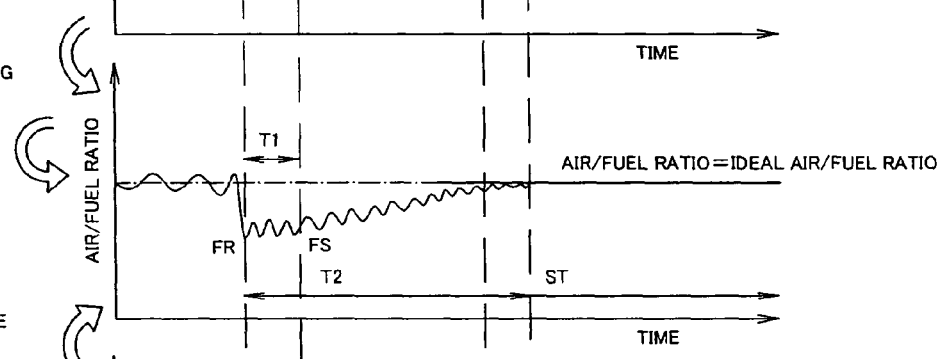
Figure 13D:
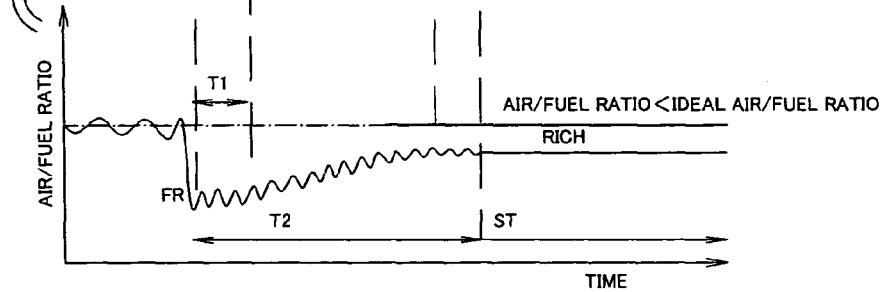

FIG. 12A is a flow chart showing operational flows if the feedback-learning is applied to the fuel increase processing in the step S13 in FIG. 6. FIG. 12B is a flow chart showing operational flows of memory processing when the engine is stopped. FIG. 13A to FIG. 13D are graphs showing how the engine revolutions and the air/fuel ratio change by the proceeding steps shown in FIG. 12, in which FIG. 13A shows the change in the engine revolutions with the passage of time, FIG. 13B shows the change in the air/fuel ratio depending on the passage of time if the fuel increasing value is reduced by the feedback-learning in the fourth embodiment, FIG. 13C shows the change in the air/fuel ratio depending on the passage of time if the air/fuel ratio is ideal when the engine is stopped, and FIG. 13D shows the change in the air/fuel ratio depending on the passage of time if the fuel increasing value is increased by the feedback-learning in the fourth embodiment.

In the fuel increase processing by the feedback-learning in FIG. 12A, it is judged whether or not the air/fuel ratio memorized, for example, by the backup RAM or the like at the previous stop time of the engine is over a predetermined range of threshold values set in advance (step S131). Specifically, the air/fuel ratio memorized by the air/fuel memory device may be an air/fuel ratio as the maximum value during the stop, as an average value, or as a statistically modeled value. Especially, the threshold values of the predetermined air/fuel ratio set in advance may substantially range from "14.5" to "16.0".

Next, in the step S131, if the air/fuel ratio memorized at the previous stop time is greater than the predetermined upper threshold value (the step S131: >GREATER), the fuel increasing value is increased (step S132).

On the other hand, in the step S131, if the air/fuel ratio memorized at the previous stop time is less than the predetermined lower threshold value (the step S131: <LESS), the fuel increasing value is decreased (step S133).

On the other hand, in the step S131, if the air/fuel ratio memorized at the previous stop time is within the predetermined range of threshold values (the step S131:=WITHIN), the fuel increasing value is secured as it is.

As shown in FIG. 12B, every time the engine is stopped, under the control of the EFIECU 170, the air/fuel ratio is directly measured or indirectly estimated with the oxygen concentration sensor, and is memorized on the backup RAM or the like, for example (step S100). Incidentally, the oxygen concentration sensor may be an air/fuel sensor whose output continuously changes depending on the concentration of oxygen, or an O2 sensor on which the concentration of oxygen suddenly changes at a predetermined value.

On the basis of the fuel increasing value, which is increased, decreased, or corrected in the above manner, the fuel increase processing of increasing the amount of fuel in the combustion chamber 20 from the present amount is subsequently performed (the step S13 in FIG. 6). Specifically, the fuel is pumped under pressure from the fuel pump 24 to the fuel injection valve 22, and the fuel injection valve 22 injects the fuel into the combustion chamber 20 in response to the control of the EFIECU 170.

Next, with reference to FIG. 13A to FIG. 13D, changes in the engine revolutions and the air/fuel ratio in the fourth embodiment will be explained, wherein the fuel increase processing is performed by the feedback-learning. Incidentally, changes in the engine revolutions from the idle operation to the engine stop in FIG. 13A are the same as those in the first embodiment in FIG. 7A.

As shown in FIG. 13B, if the air/fuel ratio measured when the engine is stopped is greater than a predetermined threshold value, e.g. the ideal air/fuel ratio, the feedback-learning is applied to the fuel increase processing to increase the fuel increasing value. Specifically, the exhaust gases in the up steam of the catalyst are rapidly cooled when the engine is stopped, and the volume of the catalyst decreases. If there are defects, such as imperfect sealing, air is drawn into from this portion and the air/fuel ratio becomes lean, but this can be treated with because the fuel increasing amount is increased.

As shown in FIG. 13C, if the air/fuel ratio measured when the engine is stopped is substantially or fully equal to the predetermined threshold value, e.g. the ideal air/fuel ratio, the feedback-learning is applied to the fuel increase processing to secure the fuel increasing value.

As shown in FIG. 13D, if the air/fuel ratio measured when the engine is stopped is less than the predetermined threshold value, e.g. the ideal air/fuel ratio, the feedback-learning is applied to the fuel increase processing to decrease the fuel increasing value. Specifically, in the direct injection gasoline engine, if the fuel leaks at the inactive time of the fuel injection, the exhaust system at the stop time becomes rich, but this can be treated with because the fuel increasing amount is decreased. On the other hand, in a port injection gasoline engine, when the adhesive amount of fuel adhering to an intake port and an intake valve increases, the exhaust system at the stop time becomes rich, but this can be treated with because the fuel increasing amount described above is decreased.

As described above, the accurate air/fuel ratio control at the stop time of the engine is realized without being affected by the changes in the air/fuel ratio in the idle operation or in the idle running of the engine, so that it is possible to remarkably reduce a risk of exposing the catalyst to the lean atmosphere and prevent the catalyst deterioration more effectively.

Incidentally, in the fourth embodiment, the air/fuel ratio does not become excessively rich at the time of increasing the fuel and at the subsequent stop time of the engine, so that there is little or no chance to increase the emissions of HC and CO at the time of increasing the fuel and at the restart time of the engine.

(Fifth Embodiment—Detection of Failure in Exhaust and Intake Systems by Air/fuel Ratio Control to Prevent Catalyst Deterioration)

Figure 14:
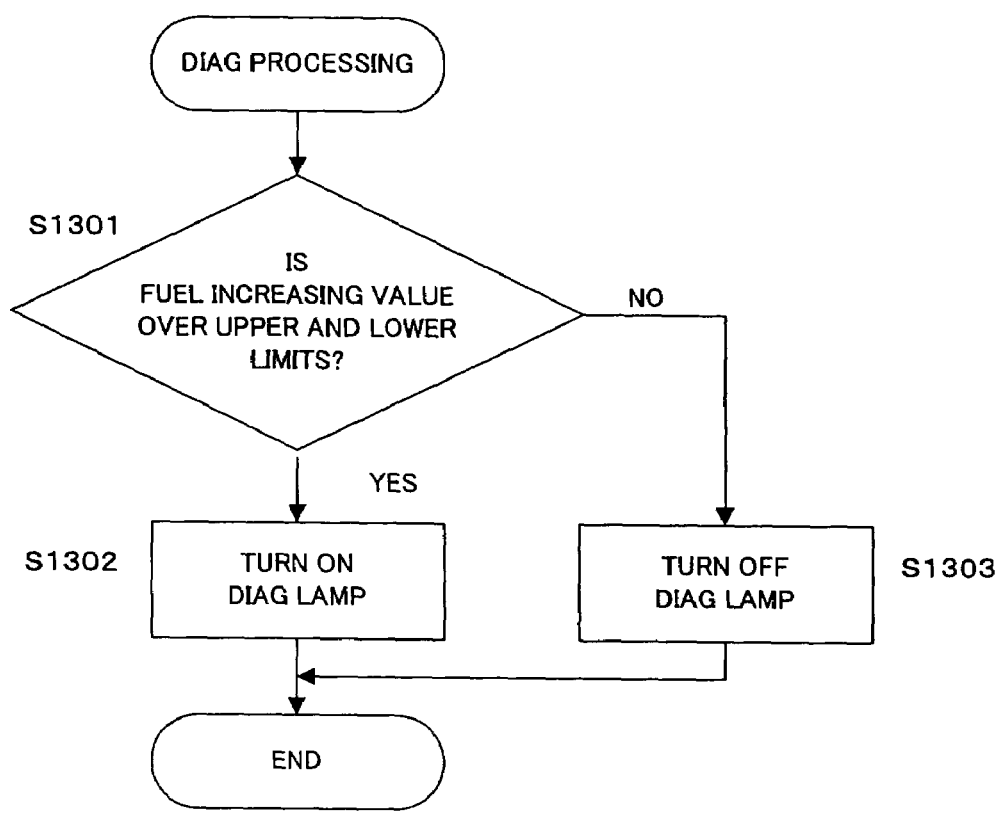
FIG. 14 is a flow chart showing operational flows to judge whether the fuel increasing value is within threshold values, in a fifth embodiment of the present invention.

Hereinafter, the fifth embodiment, in which the fourth embodiment is developed, will be explained with reference to FIG. 14 and FIGS. 15A to 15D. In the fifth embodiment, it is judged whether the fuel increasing value in the fuel increase processing is within a range of threshold values, for example, by a Diag (i.e., Diagnosis) lamp or the like, which constitutes an announcement device associated with the present invention, and on the basis of the judgment, it is possible to detect failures in the exhaust and intake systems and announce them to a driver, in addition to such a constitutional element of the fourth embodiment that accurate air/fuel ratio control is realized when the engine is stopped, by increasing, decreasing, or correcting an fuel increasing value in the fuel increase processing just before the engine stop. FIG. 14 is a flow chart to judge whether the fuel increasing value, which is increased, decreased, or corrected in FIG. 12A, is within the range of threshold values.

In Diag lamp processing in FIG. 14, it is firstly judged whether or not the fuel increasing value in the fuel increase processing is over the predetermined range of threshold values set in advance (step S1301). Specifically, it is judged whether or not the fuel increasing value is greater than a predetermined upper threshold value set in advance, and whether or not it is less than a predetermined lower threshold value. If it is judged that the fuel increasing value in this step S1301 is over the predetermined range of threshold values set in advance (the step S1301: Yes), processing of turning on the Diag lamp is performed (step S1302). On the other hand, if it is judged that the fuel increasing value in the step S1302 is within the predetermined range of threshold values set in advance (the step S1301: No), processing of turning off the Diag lamp is performed (step S1303).

Figure 15A:
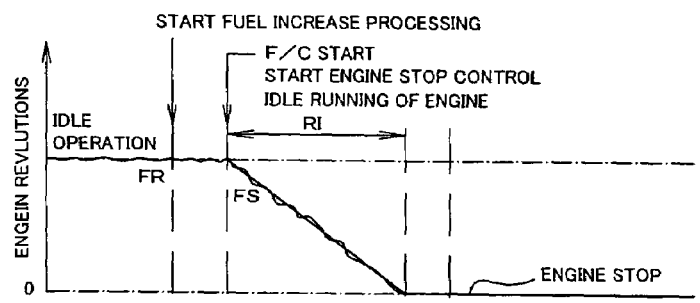

Next, with reference to FIG. 15A to FIG. 15D, changes in the engine revolutions and the air/fuel ratio in the fifth embodiment will be explained, wherein failures in the exhaust and intake systems are detected on the basis of the judgment of judging whether the fuel increasing value in the fuel increase processing in the fourth embodiment or the like is within the predetermined range of threshold values. Incidentally, changes in the engine revolutions from the idle operation to the engine stop in FIG. 15A are the same as those in the first embodiment in FIG. 7A.

Figure 15B:
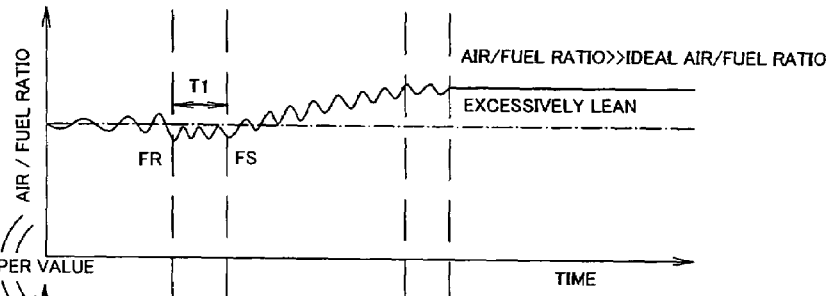

As shown in FIG. 15B, if the air/fuel ratio measured when the engine is stopped is greater than the predetermined upper threshold value, e.g. if it is significantly greater than the ideal air/fuel ratio, the fuel increasing value is increased by the fourth embodiment explained in FIG. 13B. However, if this fuel increasing value is greater than the predetermined upper threshold value, air/fuel ratio control beyond the feedback-learning is performed, so that it is detected that there is a failure in the exhaust system, such as imperfect sealing. This makes it possible to prevent beforehand that the exhaust gases, which do not pass through the catalyst, are released into the air in the normal operation of the engine to pollute the air. More specifically, the catalyst has a purification percentage of 99.9% or more, so that even if 0.1% exhaust gases are released into the air without passing through the catalyst, it is possible to avoid the worst situation that HC, CO, or NOx which is twice or more as much as that in a normal vehicle is emitted.

Figure 15C:
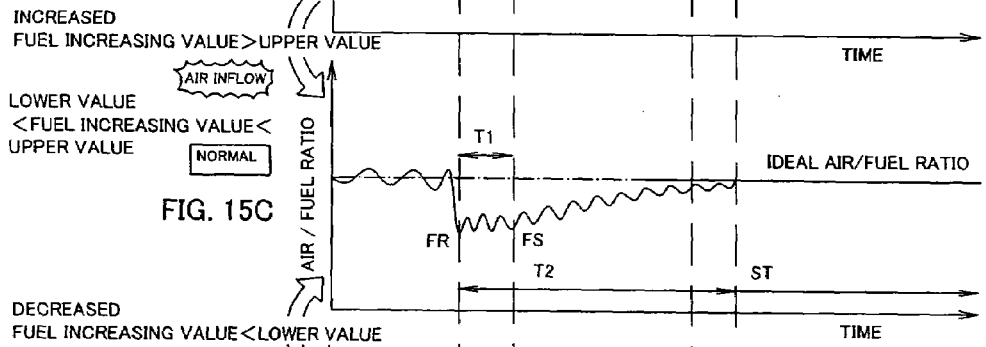

As shown in FIG. 15C, if the air/fuel ratio measured when the engine is stopped is substantially or fully equal to the predetermined threshold value, e.g. the ideal air/fuel ratio, the fuel increasing value is secured by the fourth embodiment explained in FIG. 13C. However, if this fuel increasing value is within the predetermined range of threshold values, normal air/fuel ratio control within the feedback-learning is performed, so that a failure is not detected.

Figure 15D:
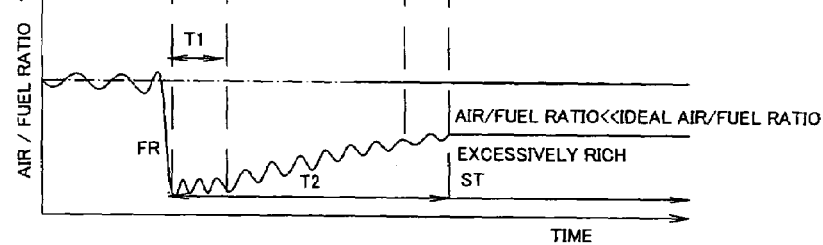

As shown in FIG. 15D, if the air/fuel ratio measured when the engine is stopped is greater than the predetermined lower threshold value, e.g. if it is significantly less than the ideal air/fuel ratio, the fuel increasing value is decreased by the fourth embodiment explained in FIG. 13D. However, if this fuel increasing value is less than the predetermined lower threshold value, air/fuel ratio control beyond the feedback-learning is performed, so that it is detected that there is a failure in the intake system, such as the leakage of fuel from the fuel injection valve. This makes it possible to prevent beforehand air pollution, the deterioration of a catalytic purification percentage, or the like. Specifically, in the direct injection gasoline engine, when the engine is stopped for a long time, the fuel, which is leaked at the inactive time of the fuel injection valve, stays in the exhaust system, and this fuel is released into the air without the purification by the catalyst when the engine is started at a cool temperature. However, the detection of this failure makes it possible to prevent air pollution beforehand. On the other hand, in the port injection gasoline engine, if the adhesive amount of fuel adhering to an intake port and an intake valve increases, it becomes lean when the engine is accelerated, or it becomes rich when the engine is decelerated, thereby deteriorating the catalytic purification percentage. However, the detection of this failure makes it possible to prevent this deterioration beforehand.

As described above, in the fifth embodiment, it is judged whether the fuel increasing value, which is increased, decreased, or corrected in the fourth embodiment, is within the predetermined threshold value, and on the basis of the judgment result, failures in the exhaust and intake systems are detected and announced to a driver, so that it is possible to prevent beforehand air pollution, the deterioration of the catalytic purification percentage, or the like.

As explained above, according to the first, second, third, fourth, or fifth embodiment, it is possible to reduce a risk of exposing the catalyst to the lean atmosphere, thereby to inhibit the progress of the catalyst deterioration.

Incidentally, in the above-described embodiments, the motor generator apparatus is provided with a plurality of motor generators constructed of synchronous motors, but in addition to or in place of at least one portion of them, it is possible to use an induction motor, a vernier motor, a direct current motor, a superconductive motor, a step motor, or the like.

In the above embodiments, the direct injection gasoline engine operated by gasoline is used as the engine 150, but in addition to it, it is possible to use various internal or external combustion engines, such as a traditional port injection gasoline engine, a diesel engine, a turbine engine, a jet engine, or the like.

In addition, the hybrid power output apparatus of the present invention may be applied to vehicles in various parallel hybrid systems and in various series hybrid systems, which are existing, which are under development, or which will be developed in the future.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Applications No. 2002-289192 filed on Oct. 1, 2002 and No. 2003-167716 filed on Jun. 12, 2003 including the specification, claims, drawings and summary are incorporated herein by reference in their entirety.

What is claimed is:

1. A power output apparatus comprising:
an engine including a combustion chamber;
a fuel supply device for supplying fuel into the combustion chamber;
an exhaust gas purification device for purifying gas emitted from the combustion chamber by a catalyst; and
a control device for controlling said fuel supply device to (1) perform first a fuel increase process of increasing an amount of the fuel in the combustion chamber from that at a present state depending on a temperature of the catalyst, and (2) perform second a fuel supply stop process of stopping supply of the fuel after passing a predetermined time from a start time point of the fuel increase process, as a control for preventing deterioration of the catalyst upon stopping said engine.

2. The power output apparatus according to claim 1, wherein said control device controls said fuel supply device such that a start time point of the fuel supply stop process coincides with a start time point of a process of stopping said engine.

3. The power output apparatus according to claim 1, wherein said control device controls said fuel supply device to perform the fuel increase process if the temperature of the catalyst is above a predetermined temperature threshold value.

4. The power output apparatus according to claim 1, wherein the predetermined time about two to three seconds from the start time point of the fuel increase process.

5. A hybrid power output apparatus comprising:
an engine including a combustion chamber;
a fuel supply device for supplying fuel into the combustion chamber;
an exhaust gas purification device for purifying gas emitted from the combustion chamber by a catalyst;
a control device for controlling said fuel supply device to (1) perform first a fuel increase process of increasing an amount of the fuel in the combustion chamber from that at a present state depending on a temperature of the catalyst, and (2) perform second a fuel supply stop process of stopping supply of the fuel after passing a predetermined time from a start time point of the fuel increase process, as a control for preventing deterioration of the catalyst upon stopping said engine; and
a motor generator apparatus which can generate electric power by using at least one portion of an output of said engine and which can output a driving force through a drive shaft.

6. The hybrid power output apparatus according to claim 5, wherein
said engine performs an intermittent operation, and
a stop time point of said engine includes a transition time point from an operating period to a down period in the intermittent operation.

7. A hybrid vehicle comprising:
(i) a hybrid power output apparatus comprising:
an engine including a combustion chamber;
a fuel supply device for supplying fuel into the combustion chamber;
an exhaust gas purification device for purifying gas emitted from the combustion chamber by a catalyst;
a control device for controlling said fuel supply device to (1) perform first a fuel increase process of increasing an amount of the fuel in the combustion chamber from that at a present state depending on a temperature of the catalyst, and (2) perform second a fuel supply stop process of stopping supply of the fuel after passing a predetermined time from a start time point of the fuel increase process, as a control for preventing deterioration of the catalyst upon stopping said engine; and
a motor generator apparatus which can generate electric power by using at least one portion of an output of said engine and which can output a driving force through a drive shaft,
(ii) a vehicle main body on which said hybrid power output apparatus is mounted; and
(iii) wheels mounted on said vehicle main body and driven by a driving force outputted through the drive shaft.

* * * * *